United States Patent
Perreault et al.

(10) Patent No.: US 12,009,746 B2
(45) Date of Patent: Jun. 11, 2024

(54) DC-DC CONVERTER BASED ON PIEZOELECTRIC RESONATOR

(71) Applicant: Massachusetts Institute of Technology, Cambridge, MA (US)

(72) Inventors: David J. Perreault, Cambridge, MA (US); Jessica Boles, Murfreesboro, TN (US); Joshua Piel, Fairfax Station, VA (US)

(73) Assignee: Massachusetts Institute of Technology, Cambridge, MA (US)

( * ) Notice: Subject to any disclaimer, the term of this patent is extended or adjusted under 35 U.S.C. 154(b) by 309 days.

(21) Appl. No.: 17/605,255

(22) PCT Filed: Jun. 12, 2020

(86) PCT No.: PCT/US2020/037418
§ 371 (c)(1),
(2) Date: Oct. 21, 2021

(87) PCT Pub. No.: WO2020/252250
PCT Pub. Date: Dec. 17, 2020

(65) Prior Publication Data
US 2022/0200449 A1     Jun. 23, 2022

Related U.S. Application Data

(60) Provisional application No. 62/861,059, filed on Jun. 13, 2019.

(51) Int. Cl.
*H02M 3/155* (2006.01)
(52) U.S. Cl.
CPC ................................ *H02M 3/155* (2013.01)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS

| 5,329,439 A | 7/1994 | Borojevic et al. |
| 6,081,438 A | 6/2000 | Saint-Pierre et al. |

(Continued)

FOREIGN PATENT DOCUMENTS

| CN | 103023454 A | 4/2013 |
| WO | WO 2020/252250 | 12/2020 |

OTHER PUBLICATIONS

International Search Report and Written Opinion dated Dec. 4, 2020 for Application No. PCT/US20/37418; 13 Pages.
(Continued)

*Primary Examiner* — Jeffrey A Gblende
(74) *Attorney, Agent, or Firm* — DALY, CROWLEY, MOFFORD & DURKEE, LLP

(57) ABSTRACT

A dc-dc converter can include a plurality of switches, a piezoelectric resonator (PR) for power stage energy storage, and a means for controlling one or more switching sequences. The switches operate in accordance with the switching sequences to transfer energy from the input to the output via the PR while providing low-loss resonant soft-charging of the PR's capacitance. The switching sequences include: connected stages in which a first and second PR terminals are both connected to one of the input, the output, or the other PR terminal; and open stages in which at least one of the first or second PR terminal is not connected by a closed switch to one of the input, the output, or the other PR terminal.

16 Claims, 21 Drawing Sheets

(58) Field of Classification Search

CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 3/1586; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/538466; H02M 7/5387; H02M 7/53871; H02M 7/53873; H02M 7/53875; H02M 1/084; H02M 1/0845; H02M 1/007; H02M 1/08; H02M 7/5395; H02M 1/14; H05B 39/048; B23K 11/24; H04B 2215/069; H02J 3/46; H02J 3/38

See application file for complete search history.

(56) References Cited

U.S. PATENT DOCUMENTS

| | | | |
|---|---|---|---|
| 7,796,710 B2* | 9/2010 | Abe | H04L 27/2276 341/172 |
| 8,378,755 B2* | 2/2013 | Nakamoto | H03B 5/36 331/116 R |
| 9,438,233 B1 | 9/2016 | Marr et al. | |
| 10,396,673 B1 | 8/2019 | Presti et al. | |
| 10,693,367 B1* | 6/2020 | Chatterjee | H02M 1/36 |
| 2004/0145920 A1 | 7/2004 | Xu et al. | |
| 2006/0262576 A1 | 11/2006 | Przybyla et al. | |
| 2006/0290449 A1 | 12/2006 | Piazza et al. | |
| 2009/0200896 A1 | 8/2009 | Morris et al. | |
| 2010/0104313 A1 | 4/2010 | Kosaka et al. | |
| 2010/0277262 A1 | 11/2010 | Phan Le et al. | |
| 2010/0328969 A1 | 12/2010 | Meyer | |
| 2012/0063504 A1* | 3/2012 | Simmons | H03K 3/017 331/8 |
| 2014/0184024 A1 | 7/2014 | Loverich et al. | |
| 2015/0145986 A1 | 5/2015 | Symko et al. | |
| 2018/0173256 A1 | 6/2018 | Dauzat | |
| 2018/0287503 A1 | 10/2018 | Depesse et al. | |
| 2019/0356222 A1 | 11/2019 | Lesso et al. | |
| 2020/0098968 A1* | 3/2020 | Despesse | H10N 30/804 |

OTHER PUBLICATIONS

International Preliminary Report on Patentability dated Dec. 23, 2021 for Application No. PCT/US20/37418; 8 Pages.

Benjamin Pollett, Ghislain Despesse, François Costa., A New Non-Isolated Low-Power Inductorless Piezoelectric DC-DC Converter, IEEE, vol. 34, No. 11, Nov. 2019, 12 pages.

Benjamin Pollett, François Costa., Ghislain Despesse, Inductor-less DC-DC converter using a piezoelectric transducer, HAL archives0ouvertes. Fr., Journeés Nationales sur la Recuperation et le Stockage d'Energie (JNRSE) 2017, Lyon, May 9-10, 2017, 3 pages.

Notification of ISR, PCT International Search Report and Written Opinion dated Dec. 4, 2020, for International Application No. PCT/US2020/37418; 12 Pages.

International Search Report and Written Opinion dated Sep. 13, 2022 for Application No. PCT/US22/28043; 7 Pages.

Boles, J. et al "Enumeration and Analysis of DC-DC converter Implementations Based on Piezoelectric Resonators" IEEE Transactions on Power Electronics; Jan. 2021; 17 Pages.

U.S. Appl. No. 18/557,172, filed Oct. 25, 2023, Boles et al.

U.S. Appl. No. 18/558,207, filed Oct. 31, 2023, Perreault et al.

PCT International Search Report and Written Opinion dated Feb. 3, 2023, for Application No. PCT/US2022/045750; 11 pages.

PCT International Search Report and Written Opinion dated Oct. 13, 2022, for International Application No. PCT/US2022/036325; 8 pages.

Touhami et al., "Implementation of Control Strategy for Step-Down DC-DC Converter Based on Piezoelectric Resonator"; $22^{nd}$ European Conference on Power Electrics and Applications; IEEE 2020; 9 pages.

Sullivan et al., "On Size and Magnetics: Why Small Efficient Power Inductors Are Rare"; Proceedings of the IEEE Intl. Symposium on 3D Power Electronic Integration and Manufacturing; Jun. 2016. pp. 1-23 (23 pages).

Perreault et al., "Opportunities and Challenges in Very High Frequency Power Conversion"; Proceedings of the IEEE Applied Power Electronics Conference and Exposition; Feb. 2009. pp. 1-14 (14 pages).

Kyaw et al., "Fundamental Examination of Multiple Potential Passive Component Technologies for Future Power Electronics"; IEEE Transactions on Power Electronics, vol. 33, No. 12; 2018; 9 pages.

Braun et al., "Inductorless Soft Switching DC-DC Converter with an Optimized Piezoelectric Resonator"; Proceedings of the IEEE Applied Power Electronics Conference and Exposition; Mar. 2020 in New Orleans, Louisiana; pp. 2272-2278 (7 pages).

Moon et al., "High Power DC-DC Conversion Applications of Disk-Type Radial Mode Pb (Zr, Ti) O3 Ceramic Transducer"; Japanese Journal of Applied Physics, vol. 50, No. 9S2; 2011; p. 09ND20 (7 pages).

Pollet et al., "A New Non-Isolated Low Power Inductorless Piezoelectric DC-DC Converter"; IEEE Transactions on Power Electronics, vol. 34, No. 11; 2019; pp. 11002-11013 (12 pages).

Flynn et al., "Fundamental Limits on Energy Transfer and Circuit Considerations for Piezoelectric Transformers"; IEEE Transactions on Power Electronics, vol. 17, No. 1; 2002. pp. 8-14 (7 pages).

Alonso et al., "A Novel Control Method for Piezoelectric-Transformer Based Power Supplies Assuring Zero-Voltage-Switching Operation"; IEEE Transactions on Industrial Electronics, vol. 55, No. 3; 2008; pp. 1085-1089 (5 pages).

Ekhtiari et al., "Dynamic Optimum Dead Time in Piezoelectric Transformer-Based Switch-Mode Power Supplies"; IEEE Transactions on Power Electronics, vol. 32, No. 1; 2017; pp. 783-793 (11 pages).

Horsley et al., "Analysis of Inductorless Zero-Voltage-Switching Piezoelectric Transformer-Based Converters"; IEEE Transactions on Power Electronics, vol. 27, No. 5; 2012; pp. 2471-2483 (13 pages).

Boles et al., "High-Efficiency Operating Modes for Isolated Piezoelectric-Transformer-Based DC-DC Converters"; Proceedings of the IEEE Workshop on Control and Modeling for Power Electronics; Nov. 30, 2020; pp. 1-8 (8 pages).

Van Dyke et al., "The Piezo-Electric Resonator and its Equivalent Network"; Proceedings of the Institute of Radio Engineers, vol. 16, No. 6; May 1928; pp. 742-764 (23 pages).

Ballato et al., "Modeling Piezoelectric and Piezomagnetic Devices and Structures via Equivalent Networks"; IEEE Transactions on Ultrasonics, Ferroelectrics, and Frequency Control, vol. 48, No. 5; 2001; pp. 1189-1240 (52 pages).

(56) References Cited

OTHER PUBLICATIONS

Wang et al., "Comprehensive Analysis of Models and Operational Characteristics of Piezoelectric Transformers"; Proc. IEEE Applied Power Electronics Conference and Exposition; Mar. 2020 in New Orleans, Louisiana; pp. 1422-1429 (8 pages).
Sherrit et al., "Comparison of the Mason and KLM Equivalent Circuits for Piezoelectric Resonators in the Thickness Mode"; Proc. IEEE Ultrasonics International Symposium, vol. 2; Oct. 1999 in Tahoe, Nevada; pp. 921-926 (6 pages).
Boles et al., "Analysis of High-Efficiency Operating Modes for Piezoelectric Resonator-Based DC-DC Converters"; Proc. IEEE Applied Power Electronics Conference and Exposition; Mar. 2020 in New Orleans, Louisiana; pp. 1-8 (8 pages).
"Ready to Deliver Piezoelectric Ceramics"; APC International, Ltd. [Online] at: https://www.americanpiezo.com/ready-to-deliver-piezoelectric-cermaics.html; accessed: Oct. 30, 2023; 16 pages.
"Physical and Piezoelectric Properties of APC Materials"; APC International, Ltd. [Online] at: https://www.americanpiezo.com/apc-materials/physical-piezoelectric-properties.html; accessed: Oct. 30, 2023; 3 pages.
"Ceramic Materials"; Boston Piezo Optics Inc. [Online] at: https://www.bostonpiezooptics.com/ceramic-materials-pzt; accessed: Oct. 30, 2023; 3 pages.
"Ceramic Components"; Omega Piezo Technologies. [Online] at: https://www.omegapiezo.com/ceramic-components/; accessed: Oct. 30, 2023; 3 pages.
"Electro-Ceramic Products and Material Specifications"; Harris Corporation; 2017; 46 pages.
"PZT Materials Complete Properties"; CTS Corporation; Jul. 2021; 5 pages.
"Piezoceramic Hard Materials Material Data"; CeramTec.; Nov. 2019; 3 pages.
Berlincourt et al., "Properties of Morgan Electro Ceramic Ceramics"; Technical Publication TP-226; Morgan Electro Ceramics; 2000. (12 pages).
Boles et al., "Evaluating Piezoelectric Materials for Power Conversion"; Proceedings of the IEEE Workshop on Control and Modeling for Power Electronics; Nov. 2020; 8 pages.
Braun et al., "Optimized Resonators for Piezoelectric Power Conversion"; IEEE Open Journal of Power Electronics; Mar. 2021; 13 pages.
Touhami et al., "A New Topology of DC-DC Converter Based on Piezoelectric Resonator"; 2020 IEEE 21$^{st}$ Workshop on Control and Modeling for Power Electronics (COMPEL); 2020; pp. 1-7 (7 pages).
Yang et al., "Resonant Current Estimation and Phase-Locked Loop Feedback Design for Piezoelectric Transformer-Based Power Supplies"; IEEE Transactions on Power Electronics, vol. 35, No. 10; 2020; pp. 10466-10476 (11 pages).
Forrester et al., "Influence of Spurious Modes on the Efficiency of Piezoelectric Transformers: A Sensitivity Analysis"; IEEE Transactions on Power Electronics, vol. 36, No. 1; Jan. 2021; 13 pages.
Hubert et al., "Piezoelectric EMI Filter for Switched-Mode Power Supplies"; IEEE Transactions on Power Electronics, vol. 36, No. 6; Jun. 2021; 20 pages.
Wang et al., "Design and Analysis of Tunable Piezoelectric Transformer Based DC/DC Converter with AC Output Inductor"; 2020 IEEE Applied Power Electronics Conference and Exposition; Mar. 2020 in New Orleans, Louisiana; pp. 1398-1403 (6 pages).
Uchino et al., "Loss Mechanisms in Piezoelectrics: How to Measure Different Losses Separately"; IEEE Transactions on Ultrasonics, ferroelectrics, and frequency control, vol. 48, No. 1; 2001; pp. 307-321 (15 pages).
"Material Properties"; Piezo Technologies. [Online] at: https://www.piezotechnologies.com/materials-chart/; 1 page.
"Physical and Piezoelectric Properties of T&P Materials"; T & Partners Praha [Online] at: https://www.tpartnerspraha.com/maretials-type-1.html; accessed: Oct. 30, 2023; 2 pages.

"Lithium Niobate"; Boston Piezo Optics Inc. [Online] at: https://www.bostonpiezooptics.com/lithium-niobate; accessed: Oct. 30, 2023; 5 pages.
Costinett et al., "Circuit-Oriented Treatment of Nonlinear Capacitances in Switched-Mode Power Supplies"; IEEE Transactions on Power Electronics, vol. 30, No. 2; 2014; pp. 985-995 (11 pages).
Pollet et al., "Inductor-less DC-DC converter using a piezoelectric transducer"; HAL archives0ouvertes.Fr., Journeés Nationales sur la Recuperation et le Stockage d'Energie (JNRSE) 2017, Lyon, May 9-10, 2017; 3 pages.
Equivalent Circuit Parameters for Piezo Transformers; Steiner & Martins, Inc.; online: https://steminc.com/piezo/EquivCircuitPT.asp; 1 page.
Lin et al., "Inductor-less Piezoelectric Transformer Electronic Ballast for Linear Fluorescent Lamp"; Proc. IEEE Applied Power Electronics Conference and Exposition; Mar. 2001 in Anaheim, California; pp. 664-669 (6 pages).
Foster et al., "Critical Design Criterion for Achieving Zero Voltage Switching in Inductorless Half-Bridge-Driven Piezoelectric-Transformer-Based Power Supplies"; IEEE Transactions on Power Electronics, vol. 31, No. 7; 2015; pp. 5057-5066 (10 pages).
Ekhtiari et al., "State-of-the-Art Piezoelectric Transformer-Based Switch Mode Power Supplies"; IECON 40$^{th}$ Annual Conference of the IEEE Industrial Electronics Society; 2014; pp. 5072-5078 (7 pages).
Sanz et al., "Magnetic-less Converter Based on Piezoelectric Transformers for Step-Down DC/DC and Low Power Application"; Proc. IEEE Applied Power Electronics Conference and Exposition; Feb. 2003 in Miami Beach, Florida; pp. 615-621 (7 pages).
Vasic et al., "Piezoelectric Transformer-Based DC/DC Converter with Improved Burst-Mode Control"; 2013 IEEE Energy Conversion Congress and Exposition; 2013; pp. 140-146 (7 pages).
Ju et al., "Piezoelectric Ceramic Acting as Inductor for Capacitive Compensation in Piezoelectric Transformer"; IET Power Electronics, vol. 8, No. 10; 2015; pp. 2009-2015 (7 pages).
Ekhtiari et al., "Analysis of Bi-Directional Piezoelectric-Based Converters for Zero-Voltage Switching Operation"; IEEE Transactions on Power Electronics, vol. 32, No. 1; 2017; pp. 866-877 (12 pages).
Rodgaard et al., "Empiric Analysis of Zero Voltage Switching in Piezoelectric Transformer Based Resonant Converters"; Proc. IET International Conference on Power Electronics, Machines, and Drives; Mar. 2012 in Bristol, United Kingdom; 6 pages.
Rodgaard et al., "Bi-Directional Piezoelectric Transformer Based Converter for High-Voltage Capacitive Applications"; Proc. IEEE Applied Power Electronics Conference and Exposition; Mar. 2015 in Charlotte, North Carolina; pp. 1993-1998 (6 pages).
Rodgaard et al., "Forward Conduction Mode Controlled Piezoelectric Transformer-Based PFC LED Drive"; IEEE Transactions on Power Electronics, vol. 28, No. 10; 2012; pp. 4841-4849 (9 pages).
Chen et al., "ZVS Considerations for a Phase-Lock Control DC-DC Converter With Piezoelectric-Transformer"; Proc. Annual Conference of the IEEE Industrial Electronics Society; Nov. 2006 in Paris, France; pp. 2244-2248 (5 pages).
Bronstein et al., "Design Considerations for Achieving ZVS in a Half Bridge Inverter That Drives a Piezoelectric Transformer with no Series Inductor"; Proceedings of the IEEE Power Electronics Specialists Conference, vol. 2, Australia; Jun. 2002; pp. 585-590 (6 pages).
Vazquez Carazo, "Piezoelectric Transformers: An Historical Review"; Actuators, vol. 5, No. 2, MDPI; Apr. 2016; 22 pages.
Martin et al., "Characterization of a Quartz Crystal Microbalance with Simultaneous Mass and Liquid Loading"; Analytical Chemistry, vol. 63, No. 20; Oct. 1991; pp. 2272-2281 (10 pages).
Fort et al., "An Adaptive Measurement System for the Simultaneous Evaluation of Frequency Shift and Series Resistance of QCM in Liquid"; Sensors, vol. 21, No. 3; Jan. 2021; 23 pages.
Huang et al., "The Resistance-Amplitude-Frequency Effect of In-Liquid Quartz Crystal Microbalance"; Sensors, vol. 17, No. 7; Jun. 2017; 8 pages.
Wang et al., "Acoustic Bragg Reflectors for Q-Enhancement of Unreleased MEMS Resonators"; 2011 Joint Conference of the IEEE

(56) References Cited

OTHER PUBLICATIONS

International Frequency Control and the European Frequency and Time Forum (FCS) Proceedings; May 2011; pp. 1-6 (6 pages).

\* cited by examiner

DC-DC CONVERTER BASED ON PIEZOELECTRIC RESONATOR

CROSS-REFERENCE TO RELATED APPLICATIONS

This application claims the benefit under 35 U.S.C. § 119 of PCT Application No. PCT/US2020/037418 filed on Jun. 12, 2020, which claims the benefit of provisional patent application number 62/861,059 filed on Jun. 13, 2019, both of which applications are hereby incorporated by reference herein in their entirety.

FIELD

This disclosure relates generally to power electronics and, more particularly, to converters based upon piezoelectric resonators.

BACKGROUND

As is known in the art, power electronics face ever-increasing demands for miniaturization, integration, and lower cost that are becoming challenging to meet with conventional approaches. Miniaturization tends to be limited by energy storage elements, particularly magnetics, which constitute a large portion of a power converter's total volume. Significant power density advances in power electronics have been achieved through minimizing the sizes of these magnetics or, where possible, removing them entirely. Operating at higher switching frequencies reduces the energy storage requirements of magnetics and in principle permits them to be smaller. Nonetheless, magnetic core materials place limits on frequency scaling, and the achievable power densities of magnetics fundamentally reduces at lower volumes. Switched capacitor (SC) converters, which do not require magnetics, have achieved record-breaking power densities, but they are less effective at electrical isolation and voltage regulation beyond fixed conversion ratios.

There is thus an opportunity for new energy storage mechanisms for power conversion that can offer major advance in achievable miniaturization at high efficiency. Piezoelectric components (piezoelectric resonators (PRs) and transformers (PTs)), store energy in mechanical inertia and compliance and show very high promise in both achievable power density and achievable efficiency. Emerging piezoelectric materials such as lithium niobate offer extremely high power densities and quality factors, and piezoelectric components offer improved scaling properties as compared to magnetic components. Moreover, piezoelectrics provide natural mechanisms for galvanic isolation, can offer highly planar form factors, and are suitable for batch mass manufacturing.

SUMMARY

While piezoelectric materials have been used extensively for sensing, actuation, transduction, and energy harvesting applications, their use in power conversion has been more limited. The concept has a very long history, and PTs have seen widespread adoption for driving CCFLs, usually with the assistance of one or more additional magnetic component(s). PTs have been introduced in dc-dc converters, but mainly with additional magnetics, which detracts from their potential power density advantages. Magnetics-free designs have been examined using PTs and single-port PRs, but without a systematic investigation into the full realm of possible PR-based converter implementations.

Described are dc-dc converter topologies and switching sequences that utilize a PR as the energy transfer component, and that provide low-loss "soft" charging of the PR capacitance for high efficiency. Such dc-dc converter topologies and switching sequences can leverage single-port PRs by employing them as the sole energy storage elements for power conversion. Particular converter implementations can be selected based upon practical considerations and energy transfer characteristics.

According to one aspect of the disclosure, a dc-dc converter having an input and an output comprises: a plurality of switches; a piezoelectric resonator (PR) having a first terminal and a second terminal, wherein the switches operate in accordance with one or more switching sequences to transfer energy from the input to the output via the PR while providing low-loss resonant soft-charging of the PR's capacitance; and means, coupled to the plurality of switches, for controlling the switching sequences. The switching sequences include: connected stages in which the first PR terminal and the second PR terminal are both connected to one of the input, the output, or the other PR terminal; and open stages in which at least one of the first PR terminal or the second PR terminal is not connected by a closed switch to one of the input, the output, or the other PR terminal. At least one of the switching sequences includes at least six stages alternating between connected stages and open stages in which the connected stages each comprise a connection of the first PR terminal or the second PR terminal to one of the input or the output and a connection of the other PR terminal to a different node of the converter.

In some embodiments, at least one of the switching sequences includes at least six stages alternating between connected stages and open stages in which one of the connected stages comprises a zero stage in which the first PR terminal and the second PR terminal are connected. In some embodiments, at least one of the switching sequences provides zero-voltage switching (ZVS) of each of the switches. In some embodiments, at least one of the switching sequences that provides ZVS includes at least one open stage during which the change voltage on the first and second PR terminals is split into two sections. In some embodiments, at least one of the switching sequences includes at least eight stages. In some embodiments, the switching sequences include one or more switching sequences that has exactly one span of positive PR resonant current and exactly one span of negative PR resonant current.

In some embodiments, the switching elements can include unidirectional-blocking switches. In some embodiments, the plurality of switching elements includes four unidirectional-blocking switches. In some embodiments, the unidirectional-blocking switches are provided as field effect transistors (FETs). In some embodiments, the unidirectional-blocking switches are provided as metal oxide semiconductor field effect transistors (MOSFETs). In some embodiments, at least one of the switching elements includes a diode switch.

According to another aspect of the disclosure, a two-stage dc-dc converter can include a piezoelectric-resonator (PR) converter stage and a switched capacitor (SC) converter stage coupled to the PR-based converter stage in a cascaded arrangement. The PR converter stage may be the same as or similar to the PR-based dc-dc converter described above.

According to another aspect of the disclosure, a hybrid dc-dc converter can include a piezoelectric-resonator (PR)

converter disposed within a switched capacitor (SC) converter and switching sequences that utilize both the capacitors and the PR as energy transfer components.

BRIEF DESCRIPTION OF THE DRAWINGS

The manner of making and using the disclosed subject matter may be appreciated by reference to the detailed description in connection with the drawings, in which like reference numerals identify like elements.

The drawings are not necessarily to scale, or inclusive of all elements of a system, emphasis instead generally being placed upon illustrating the concepts, structures, and techniques sought to be protected herein.

DETAILED DESCRIPTION

Figure 1:
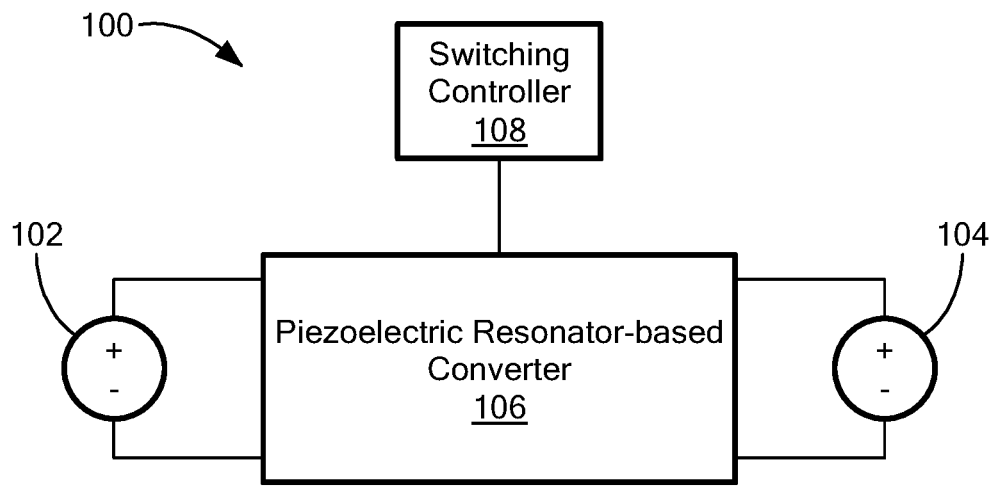
FIG. 1 is a block diagram of a system including a dc-dc converter based on a piezoelectric resonator (PR), according to some embodiments.

Referring to FIG. 1, an illustrative system 100 can include an input voltage 102, an output voltage 104, a dc-dc converter 106 disposed between the input and output voltages, and a switching controller 108, according to some embodiments. Output voltage 104 may correspond to a voltage source load. Converter may be provided as a step-up or step-down converter.

Converter 106 can include one or more piezoelectric resonators (PRs) and one or more switches arranged in given topology to selectively couple the input and output voltages 102, 104 to the PR electrodes. The one or more PRs may comprise all, or substantially all, of the energy transfer components of converter 106. For example, converter 106 may not include any capacitors, magnetics, or other energy storage components other than the one or more PRs. Thus, converter 106 may be referred to as a "PR-based" converter. Examples of topologies that can be used within converter 106 are shown and described in the context of FIGS. 5A-5I. In some embodiments, the negative terminal of input voltage 102 may be coupled to the negative terminal of output voltage 104 (i.e., system 100 may be a common-negative system).

Switching controller 108 can include hardware and/or software configured to control switches within converter 106 according to one or more switching sequences. A switching sequence can be selected to provide low-loss soft charging of the PR capacitance. Examples of switching sequences that can be implemented within controller 108 are described in detail below. In some embodiments, controller 108 can be provided as an application specific integrated circuit (ASIC).

Figure 1A:
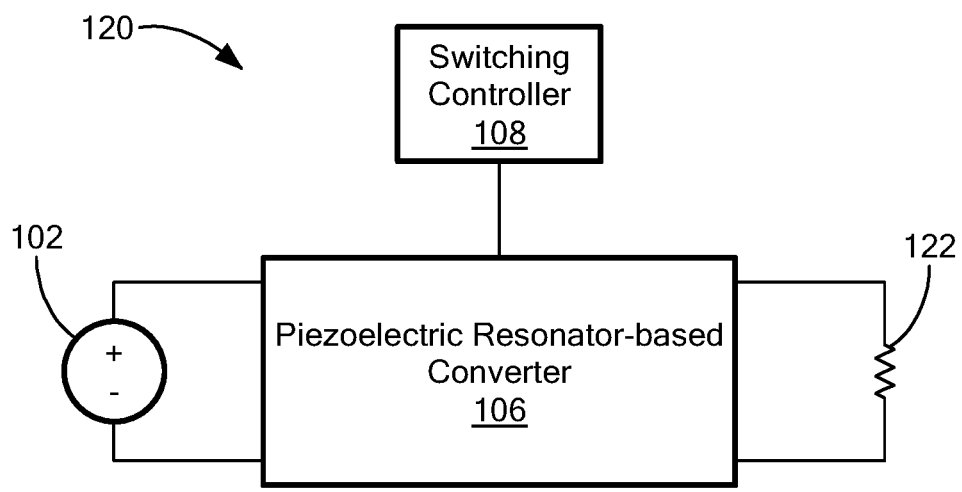
FIG. 1A is a block diagram of another system including a PR-based converter, according to some embodiments.

Referring to FIG. 1A, according to another embodiment, a system 120 can include a PR-based converter 106 coupled between an input voltage 102 and a resistive load 122. That is, embodiments of the PR-based converters disclosed herein can be used within systems having voltage source loads, as in FIG. 1, and within systems having resistive loads, as in FIG. 1A.

Figure 2:
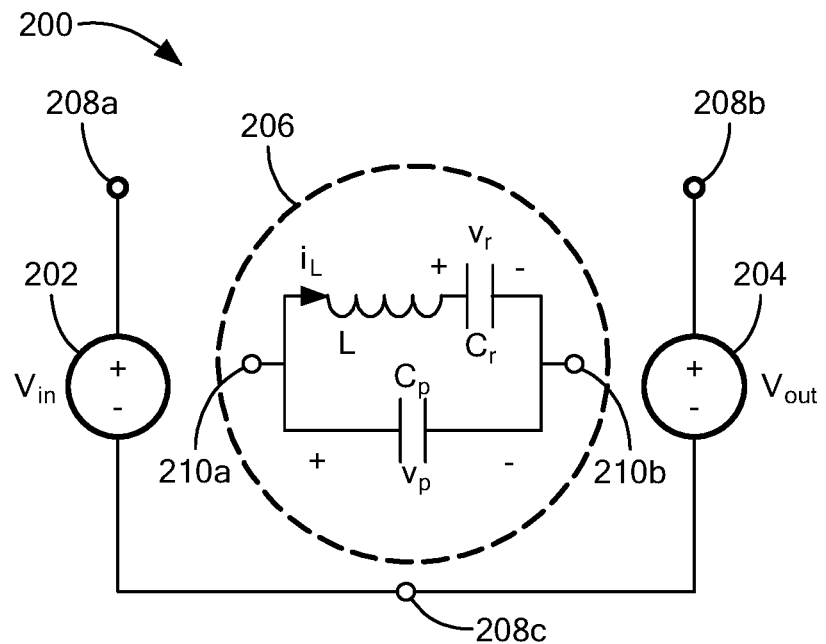
FIG. 2 is a schematic diagram of a common-negative system having a single PR.
Figure 2A:
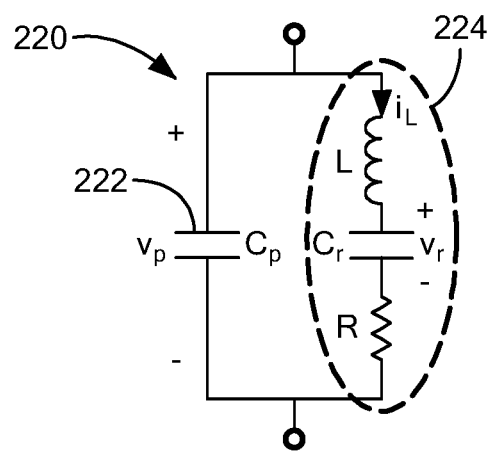
FIG. 2A is a schematic diagram of a Butterworth-Van Dyke circuit model of a PR.

Referring to FIG. 2, an illustrative common-negative system 200 can include a source ($V_{in}$) 202, a load ($V_{out}$) 204, and a single piezoelectric resonator (PR) 206 having terminals 210a and 210b. As shown in FIG. 2A, a PR can be modeled using a Butterworth-Van Dyke (BVD) circuit model 220 which includes the PR's physical electrical input capacitance 222 ($C_p$) and an LCR branch 224 to model the PR's electromechanical resonance properties. In FIG. 2, the PR is shown as an ideal PR with the resistor R omitted.

Referring again to FIG. 2, common-negative system 200 can be used to identify converter topologies and associated switching sequences that use a single PR to transfer energy. While FIG. 2 shows a system having a single PR, multiple PRs can be provided in other embodiments. Moreover, the structures and techniques sought to be protected herein are not limited to common-negative system and, for example, can be applied to common-positive systems.

The illustrative system 200 includes three nodes: positive input 208a, positive output 208b, and ground 208c. Thus, there are six distinct ways the PR 206 can be connected between the source 202 and the load 204. These six connections result in the following possible voltages $v_p$ applied to the PR 206: $V_{in}$, $-V_{in}$, $V_{in}-V_{out}$, $V_{out}-V_{in}$, $V_{out}$, $-V_{out}$. In addition to these connections, the PR's terminals 210a, 210b can also be short-circuited (creating a "zero stage") or open-circuited (creating an "open stage"). It is appreciated herein that short-circuiting or open-circuiting the PR's terminals can be done to redistribute energy within the PR.

As used herein, a "switching sequence" refers to the order of specific stages (defined by the PR terminal connections) in a switching cycle. In some embodiments, a switching sequence may be selected based on one or more of the following assumptions/criteria:

1. A switching sequence may include a predetermined minimum number of stages.
2. All connected stages have open stages between them so that $v_p$ can resonate to voltages required for soft charging $C_p$ at the stage transitions.
3. The switching sequence contains at least two connected stages (to balance energy transfer to/from the PR over a switching cycle). The combination of these stages contains at least one connection each to $V_{in}$ and $V_{out}$.
4. The same connected switching stage cannot repeat itself, even with an open stage in between.
5. The same switching stages in a different order is considered a different switching sequence, whereas the same order of switching stages with a different "first" stage is considered the same switching sequence.
6. Inverting all stages of a switching sequence results in the same switching sequence (with opposite PR polarity).
7. An "open stage" refers to the entire span of resonance between connected stages, regardless of how it may change mid-stage due to parasitic capacitances.

These assumptions/criteria reduce the number of viable switching sequences to those having even numbers of stages and a minimum of four stages. Enumerating all possible sequences and filtering the results based on the above criteria can yield seven (7) distinct four-stage switching sequences and thirty-three (33) distinct six-stage sequences.

The enumerated switching sequences can be filtered based on physical requirements for power conversion and practical considerations. For this downselection process, it can be assumed that positive average power flow from $V_{in}$ and/or to $V_{out}$ is desired for each connected stage where $V_p \neq 0$. For this to be true, $i_L$ may be on average positive during connected stages where $V_p = V_{in}$, $V_{in} - V_{out}$, or $-V_{out}$ and may be on average negative for connected stages where $V_p = -V_{in} - V_{out}$, $-V_{in}$, and $V_{out}$. Average $i_L$ constraints also apply to open stages, which require a particular charge redistribution to charge/discharge $v_p$. Positive $i_L$ removes charge from $C_p$ and therefore decreases $v_p$, while negative $i_L$ increases $v_p$.

It is recognized herein that switching sequences that can be completed in one PR resonant period (one cycle of energy exchange between L and $C_r$, referring to the modeled PR 206) may be preferred. A sequence that spans more than one resonant period would require more redistribution of energy within the PR 206 during open and zero states (during which energy is dissipated in R), higher and/or bidirectional switch blocking requirements (since $v_p$ may peak during an open state), or connected stages with significant reverse power flow to avoid these.

To identify preferred switching sequences, the aforementioned $i_L$ polarity constraints can be mapped for each stage of a switching sequence as shown in Table 1.

TABLE 1

| $V_p$ sequence: | $V_{in}$ | open | $V_{in} - V_{out}$ | open | $V_{out}$ | open |
|---|---|---|---|---|---|---|
| $i_L$ polarity: | + | + | + | + | − | − |

Table 1 shows an illustrative $i_L$ mapping for $V_{in} > 2V_{out}$, where+ and − indicate positive or negative current as required by the necessary charge transfer. The illustrated sequence can be completed in one PR resonant cycle. For a switching sequence to be completed in one PR resonant cycle, it may require only one span (one or multiple stages back-to-back) of positive $i_L$ and only one span of negative $i_L$. Filtering the potential switching sequences to only those that can be completed in one cycle can yield seven (7) four-stage and twenty (20) six-stage switching sequences each for $V_{in} > V_{out}$ and $V_{in} < V_{out}$.

It is appreciated herein that periodic steady state operation requires balance of both energy and charge on the PR across the switching cycle. For six-stage switching sequences (which can be adapted to four-stage), the following Conservation of Energy (CoE) equation must hold, wherein $V_p$ denotes the constant value of $v_p$ during a connected stage and q equals the net charge transferred by $i_L$ in that stage (with polarity specified by the above $i_L$ constraints):

$$E_1 + E_3 + E_5 = V_{p1}q_1 + V_{p3}q_3 + V_{p5}q_5 = 0 \quad (1)$$

Switching sequences for which the energy terms in equation (1) are either all positive or all negative (i.e., the only solution is $q_1 = q_3 = q_5 = 0$) are not capable of balancing the PR's energy and can therefore be eliminated from consideration.

Furthermore, the following Conservation of Charge (CoC) equations must hold for $C_p$ and $C_r$, respectively:

$$q_2 + q_4 + q_6 = 0 \quad (2)$$

$$q_1 + q_2 + q_3 + q_4 + q_5 + q_6 = 0 \quad (3)$$

Combining these two equations shows that the charge transfer during connected stages must also be balanced:

$$q_1 + q_3 + q_5 = 0 \quad (4)$$

Inserting equation (4) into equation (1) results in a general equation that can be satisfied to ensure energy balance and charge balance on the PR given a certain switching sequence. For a given switching sequence, the solution to this equation with correct q polarities is the complete voltage conversion range for which this balance holds and the switching sequence is useful; the conversion ranges for the final switching sequences are summarized in Table 2.

TABLE 2

Figure 5A:
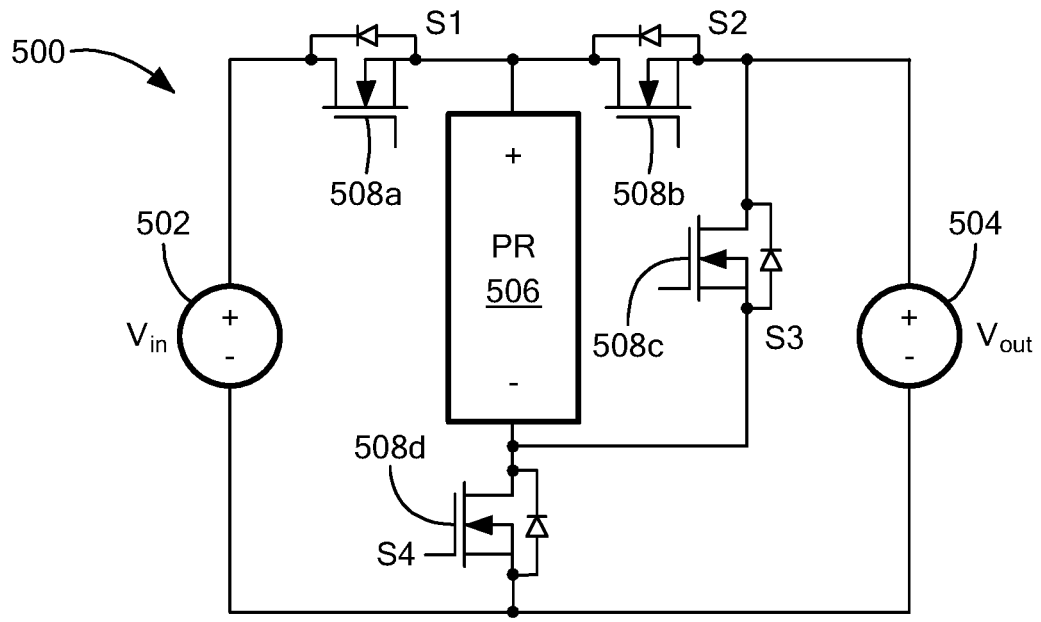
FIGS. 5A to 5I are schematic diagrams illustrating PR-based converter topologies, according to various embodiments.

| Switching Sequence | Applicable Voltage Conversion Range | Positive Instantaneous Power and Unidirectional Blocking Switches | Topology | Modification for Soft Switching (required if only 2 active switches used) |
|---|---|---|---|---|
| $V_{in} - V_{out}$, Zero, $V_{out}$ | $V_{in} > 2V_{out}$ | $i_{L1} = i_{L4} = 0$ (1) | FIG. 5A* | $i_{L4} = i_{L6B} = 0$, $V_{p6B} = V_{in}$ (1, a) |
| | $2V_{out} > V_{in} > V_{out}$ | $i_{L3} = i_{L6} = 0$ (1) | FIG. 5A | $i_{L3} = i_{L6B} = 0$, $V_{p6B} = V_{in}$ (1, a) |

TABLE 2-continued

Figure 5B:
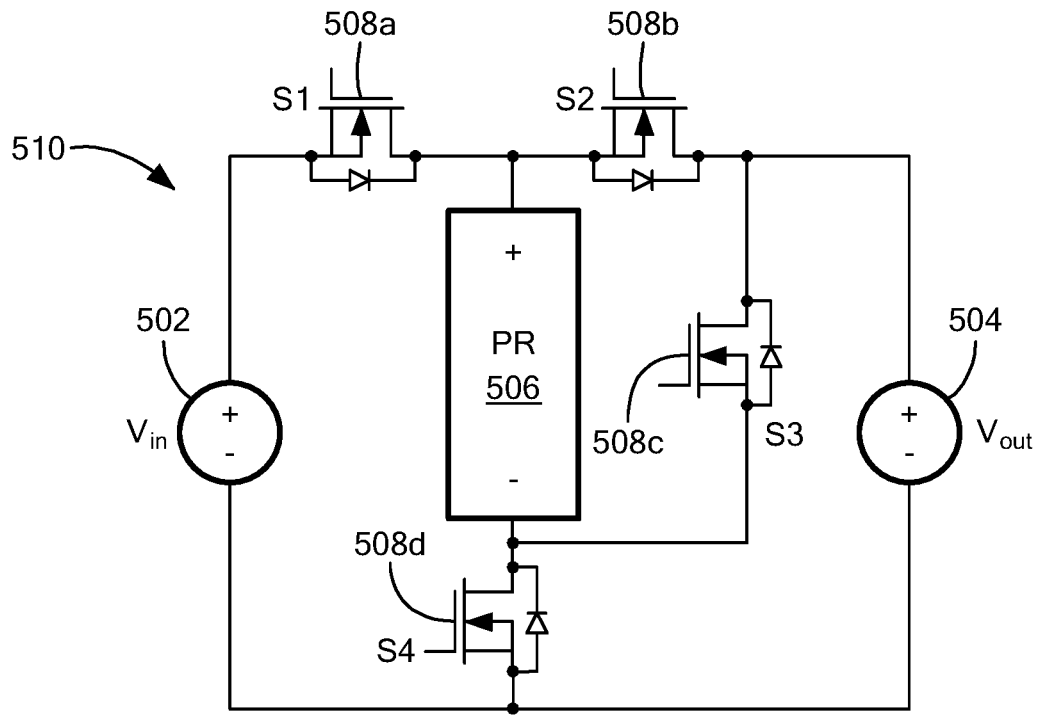
Figure 5C:
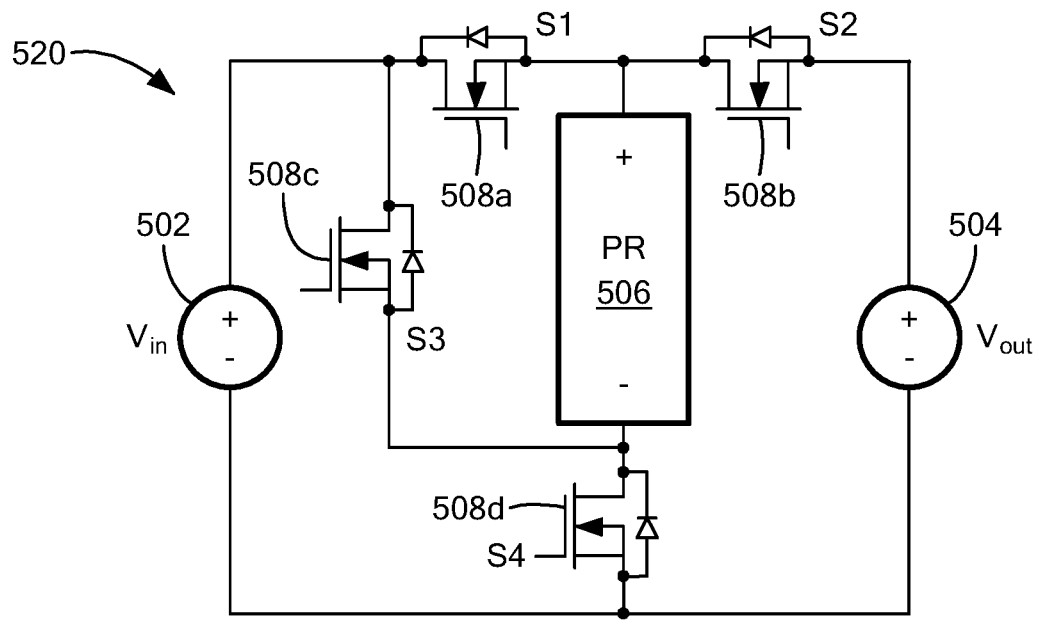
Figure 5D:
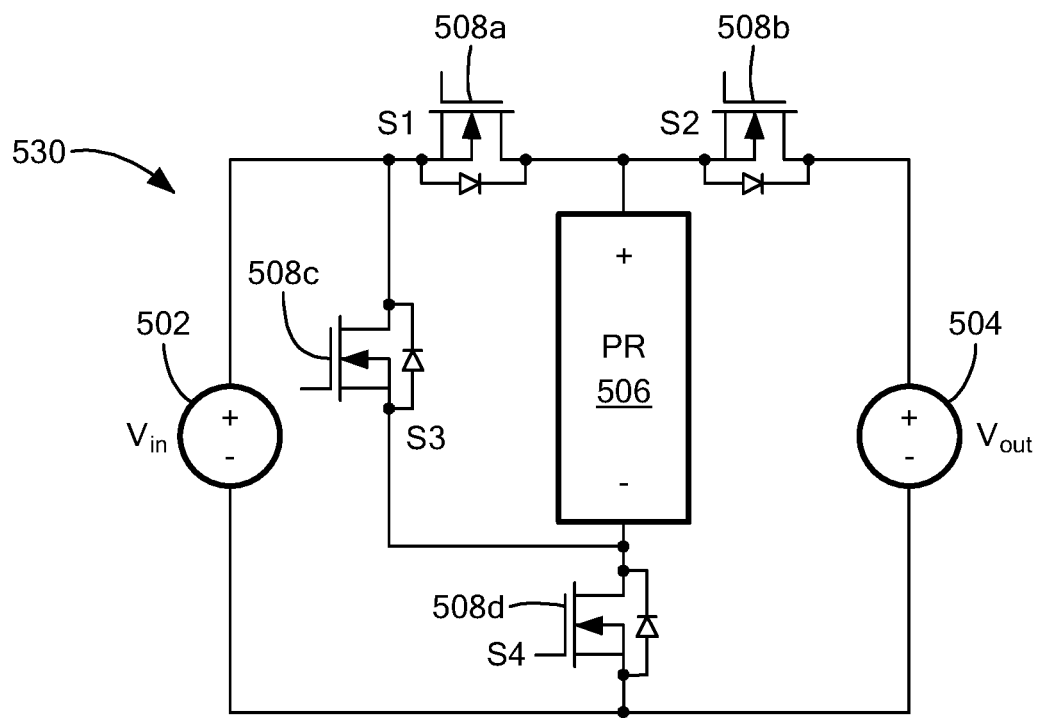
Figure 5E:
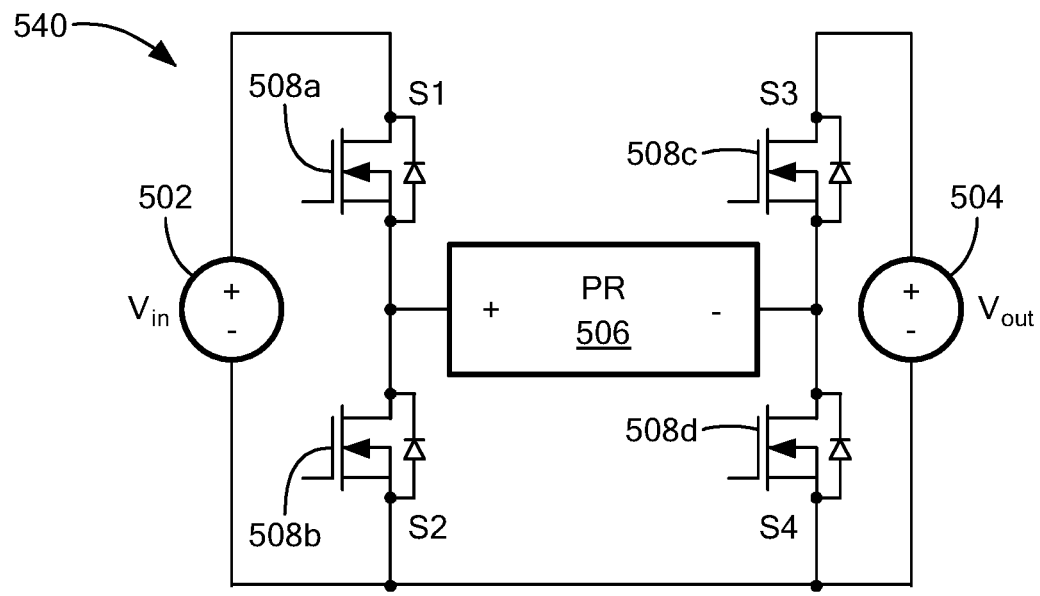
Figure 5F:
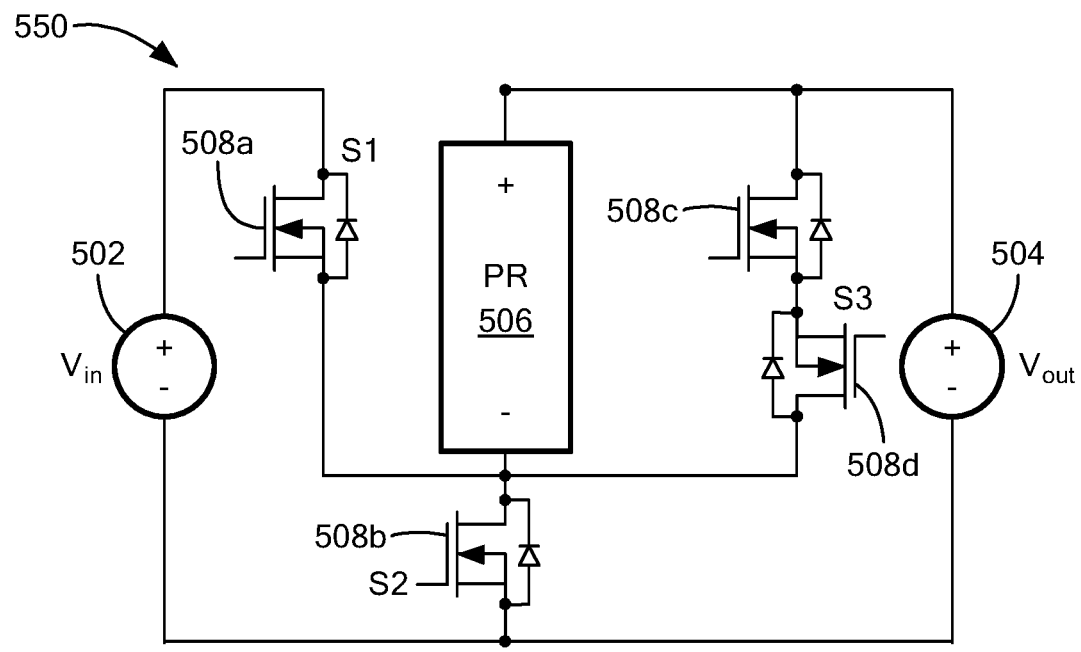
Figure 5G:
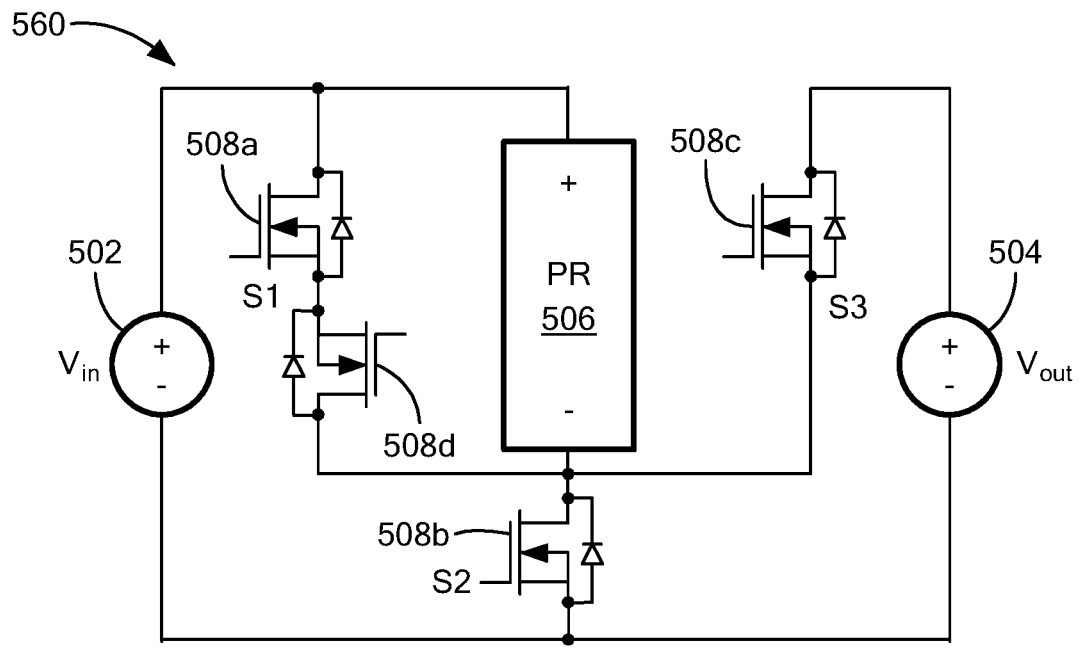
Figure 5H:
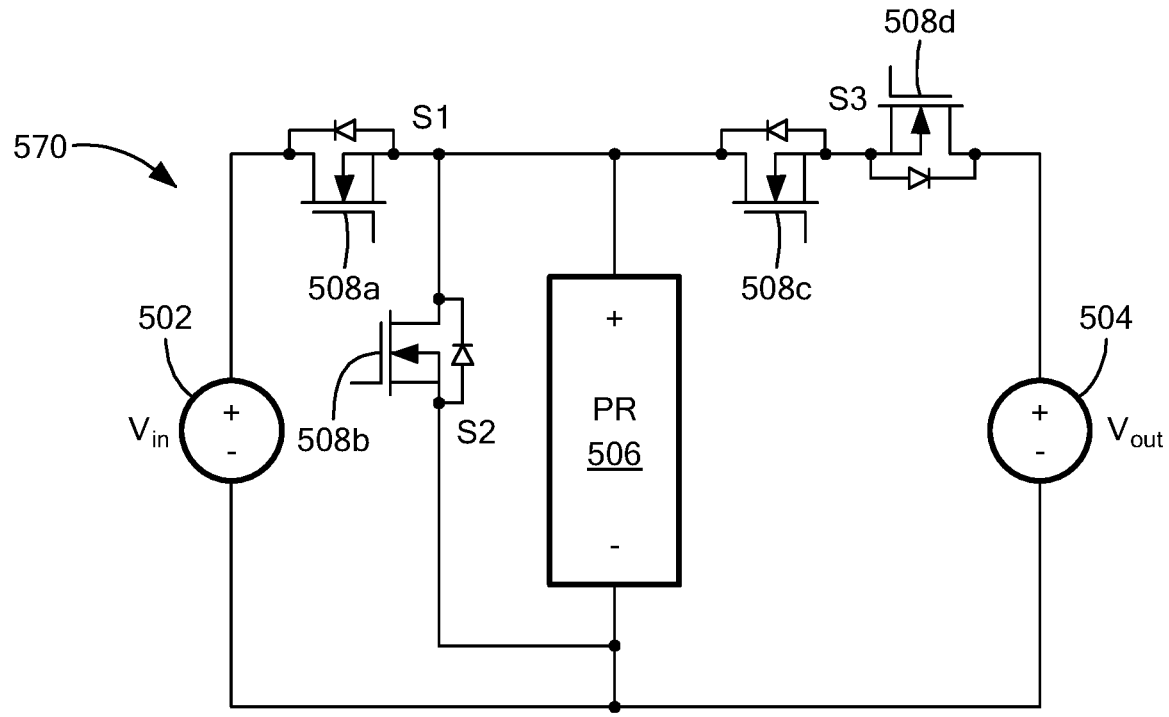
Figure 5I:
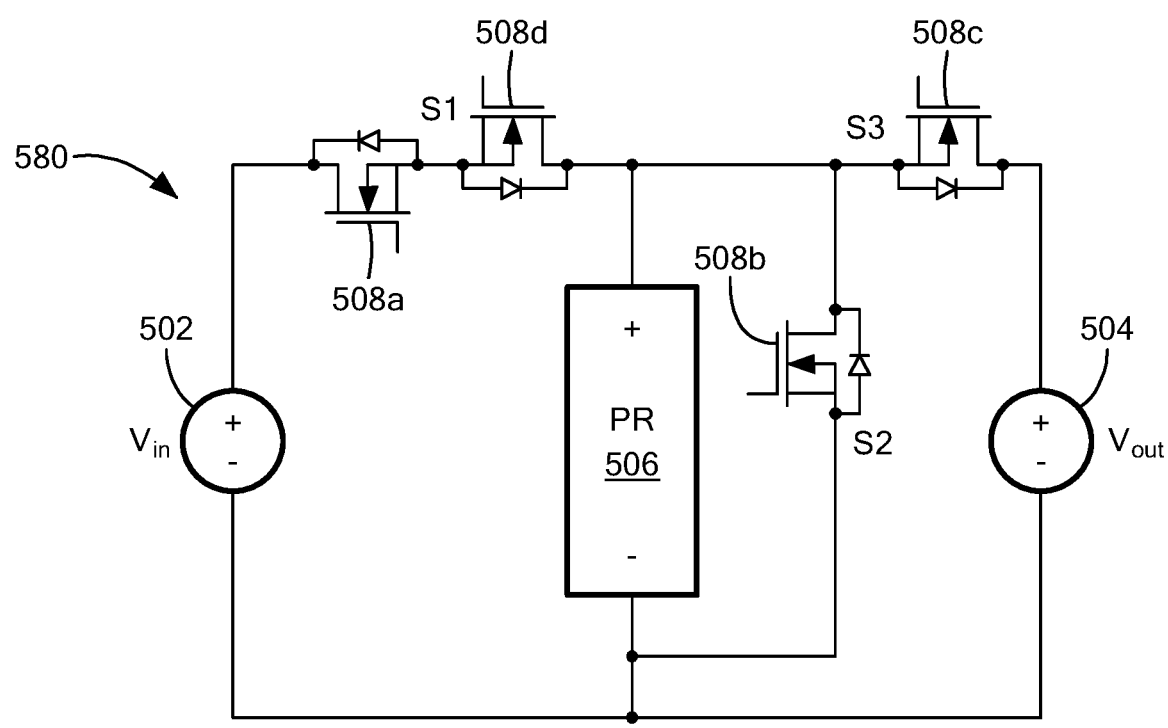

| Switching Sequence | Applicable Voltage Conversion Range | Positive Instantaneous Power and Unidirectional Blocking Switches | Topology | Modification for Soft Switching (required if only 2 active switches used) |
|---|---|---|---|---|
| $V_{in}$, $V_{in}-V_{out}$, $V_{out}$ | $2V_{out} > V_{in} > V_{out}$ | $i_{L1} = i_{L4} = 0$ (2) | FIG. 5A | $i_{L1} = i_{LAB} = 0$, $V_{p4B} = 0$ (2, a) |
| $V_{in}-V_{out}$, $-V_{out}$, Zero | $V_{in} > V_{out}$ | $i_{L1} = i_{L4} = 0$ (3) | Fig. 5C** | $i_{L1} = i_{LAB} = 0$, $V_{p4B} = -V_{in}$ (3, c) |
| | | | FIG. 5E* | $i_{LA} = i_{L6B} = 0$, $V_{p6B} = V_{in}$ (3, e) |
| | | | FIG. 5F* | No change |
| $V_{in}$, Zero, $V_{out}$ | $V_{in} < V_{out}$ | $i_{L3} = i_{L6} = 0$ (4) | FIG. 5B* | $i_{L2B} = i_{L6} = 0$, $V_{p2B} = V_{in}-V_{out}$ (4, b) |
| | | | FIG. 5D, FIG. 5I* | No change |
| | $V_{in} > V_{out}$ | $i_{L1} = i_{L4} = 0$ (4) | FIG. 5C | $i_{L1} = i_{LAB} = 0$, $V_{p4B} = V_{out}-V_{in}$ (4, c) |
| | | | FIG. 5A, FIG. 5H* | No change |
| $V_{in}$, $-V_{out}$, Zero | Any | $i_{L1} = i_{L4} = 0$ (5) | FIG. 5E | No change |
| $V_{in}$, Zero, $V_{out}-V_{in}$ | $2V_{in} < V_{out}$ | $i_{L3} = i_{L6} = 0$ (6) | FIG. 5D | $i_{L3} = i_{L6B} = 0$, $V_{p6B} = V_{out}$ (6, d) |
| | $V_{in} < V_{out} < 2V_{in}$ | $i_{L1} = i_{L4} = 0$ (6) | FIG. 5D* | $i_{LA} = i_{L6B} = 0$, $V_{p6B} = V_{out}$ (6, d) |
| $V_{in}$, $V_{out}-V_{in}$, $V_{out}$ | $V_{in} < V_{out} < 2V_{in}$ | $i_{L3} = i_{L6} = 0$ (7) | FIG. 5D* | $i_{L2B} = i_{L6} = 0$, $V_{p2B} = 0$ (7, d) |
| $V_{in}$, $V_{in}-V_{out}$, Zero | $V_{in} < V_{out}$ | $i_{L1} = i_{L4} = 0$ (7) | FIG. 5B* | $i_{LA} = i_{L6B} = 0$, $V_{p6B} = V_{out}$ (8, b) |
| | | | FIG. 5E | $i_{L1} = i_{LAB} = 0$, $V_{p4B} = -V_{out}$ (8, e) |
| | | | FIG. 5G* | No change |

Table 2 shows a summary of switching sequences and their constraints derived according to the concepts and techniques disclosed herein. Voltage conversion ranges can be calculated using equations (1)-(4) above. Practical constraints for $i_L$ are described below. Number/letter codes (e.g. "(1)") next to the $i_L$ constraints in the third and fifth columns of Table 2 correspond to the efficiency curves in FIGS. 8A and 8B, which figures are discussed below. Topologies denoted (*) may be capable of implementation with only two active switches, and topologies denoted (**) may require opposite polarity of all switching sequence voltages.

Switching sequences for which the general equation (4) cannot be satisfied without $q_1=q_3=q_5=0$ are not capable of both energy and charge balance and, thus, may be eliminated from consideration. Switching sequences for which only very specific voltage conversion ratios can satisfy this equation (e.g., $V_{in}=V_{out}$ or $V_{in}=2V_{out}$) may be deemed trivial and also eliminated. Filtering according to these criteria can eliminate all four-stage switching sequences. That is, no four-stage switching sequence may be useful outside of fixed voltage conversion ratios. By contrast, nine (9) six-stage sequences (each with step-up and step-down versions) can be identified as being capable of balancing the PR's energy and charge across a range of voltage conversion ratios.

The switch implementations needed to realize various switching sequences (e.g., the sequences illustrated in Table 2) can vary widely in terms of switch quantity and voltage blocking capability. A converter with a high number of switches is generally more complex to implement, and switches that block bidirectional voltage may be difficult to physically realize. In general, each distinct terminal connection requires its own switch, and there are three node options (positive input 208a, positive output 208b, ground 208c) to which both PR terminals 210a, 210b can be tied for zero stages. For the six-stage sequences described herein, implementations that require less than or more than four switches tend to require bidirectional voltage blocking switch(es). Filtering the switching sequences that only require four unidirectional-blocking switches (inclusive of three-switch topologies with one bidirectional-blocking switch) results in five (5) remaining switching sequences. Table 2 summarizes both the step-up and step-down versions of these switching sequences-eight (8) in total—and their corresponding topologies, which are shown in FIGS. 5A to 5I and described in detail below. The implementations for $V_{in}>V_{out}$ are the time-reversed versions of those for $V_{in}<V_{out}$.

Figure 3A:
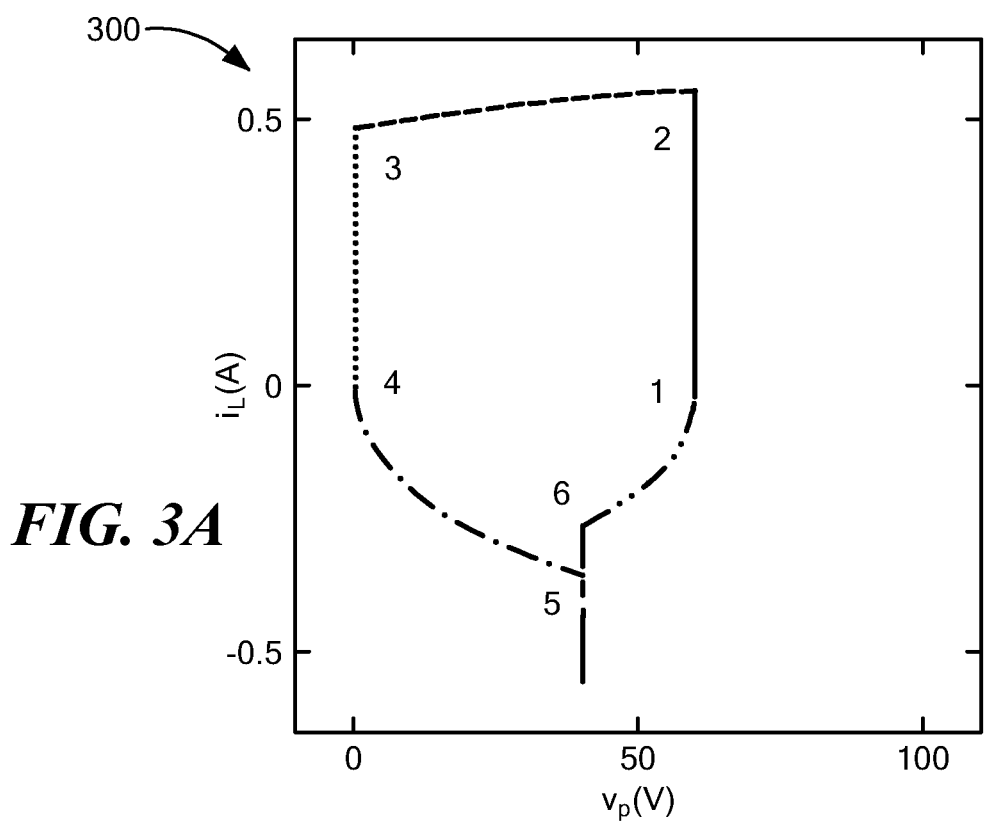
FIGS. 3A and 3B are state plane diagrams illustrating a six-stage switching sequence that can be used with a PR-based converter, according to some embodiments.
Figure 3B:
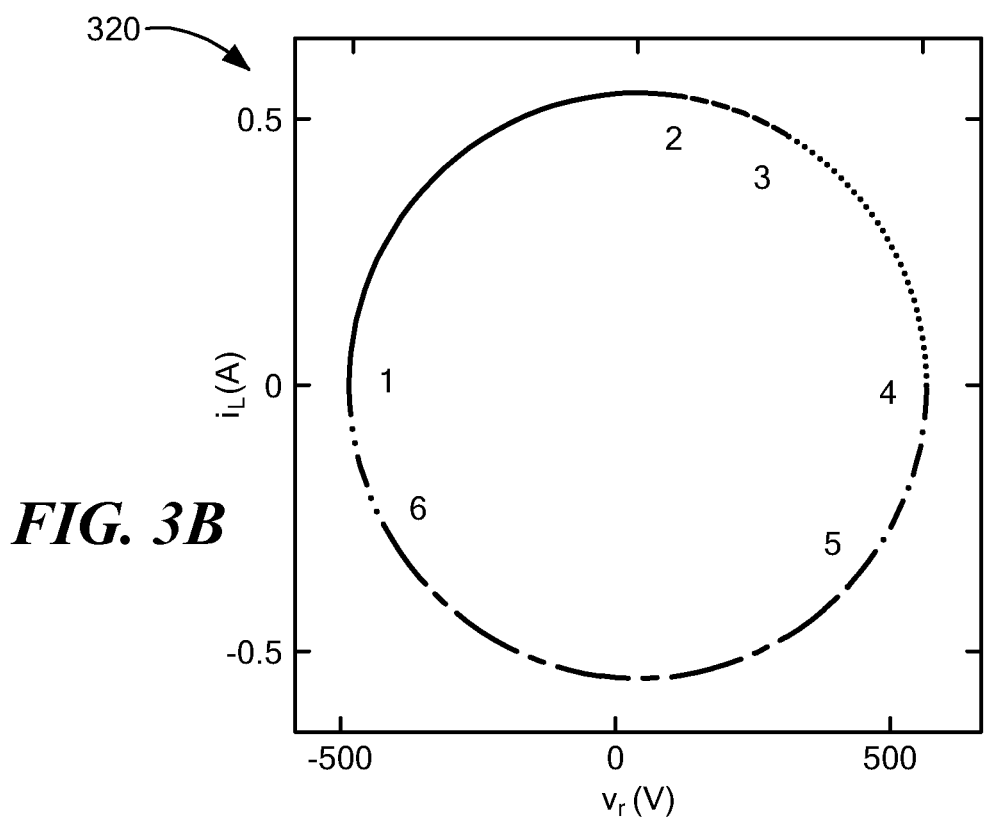

FIGS. 3A and 3B illustrate a switching sequence that can be used with a PR-based dc-dc converter, such as converter 106 of FIGS. 1 and 1A. In particular, the state plane diagrams of FIGS. 3A and 3B correspond to switching sequence: $v_p=V_{in}-V_{out}$, (open), Zero, (open), $V_{out}$, (open). In this example, $V_{in}=100$ $V_p$, $V_{out}=40$ $V_p$ $P_{out}=10$ W. The PR parameters may be the same as or similar to the parameters as shown in Table 3. It should be appreciated that the concepts and techniques disclosed herein can be applied to various other switching sequences and PR parameters.

TABLE 3

| Parameter: | $C_p$ | L | $C_r$ | R | $f_{res}$ |
|---|---|---|---|---|---|
| Value: | 4.3 nF | 1.3 mH | 1.4 nF | 2.4 Ω | 114 kHz |

Table 3 shows measured PR model parameters that may correspond to APC INTERNATIONAL part 790 (844 material disc with diameter 19.8 mm and thickness 0.8 mm). Such parameter values can be determined, for example, by curve fitting the PR's measured impedance.

To understand the progression of the PR's state variables ($v_p$, $i_L$, and $v_r$) throughout a particular switching sequence, these states can be mapped into a state space described with a pair of state planes as shown in FIGS. 3A and 3B, with FIG. 3A showing an $i_L$ vs. $v_p$ plane 300, and FIG. 3B showing an $i_L$ vs. $V_r$ plane 320. Each stage is denoted by a different line style and with a stage number label (e.g., "1," "2", "3," etc.) positioned at the starting point of the stage. The positions of these number labels correspond to the numbered variable states used to solve for a periodic steady state solution using equations (11)-(17) below. For periodic steady state operation, the final variable states should equal the initial variable states, creating a complete loop in the state planes. To avoid "hard" charging of the PR's input capacitance, $v_p$ should resonate to its voltage in the next connected stage in time for that stage to begin.

Figure 4A:
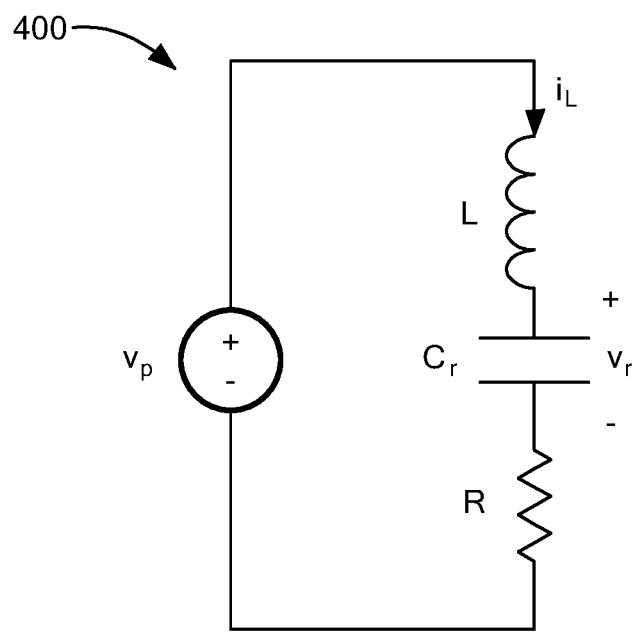
FIG. 4A shows a resonant circuit for a connected stage of switching sequence.

During the connected stages (i.e., stages 1, 3, and 5 in this example), $v_p$ may stay constant ($V_p$) at some combination of $\pm V_{in} \pm V_{out}$, and 0 depending on the PR terminal connections. L and $C_r$ resonate in the equivalent circuit 400 of FIG. 4A, with $i_L$ and $V_r$ described by normalized circular arcs (if with no loss) around a center point of $(0, V_p)$ on the $i_L$ vs. $V_r$ plane 320. $i_L$ reflects the same vertical change on the $i_L$ vs. $V_p$ plane 300 with a constant $v_p$. The PR acquires and releases energy (through $i_L$ and $V_r$) during stages connected to the source/load system (e.g., to source 102 and load 104 of FIG. 1), and whether its energy increases or decreases depends on the polarities of $V_p$ and $i_L$.

During the open stages (i.e., states 2, 4, and 6 in this example), all three state variables participate in resonance, and the effective capacitance reduces to the series combination of $C_p$ and $C_r$:

$$C_{eff} = \frac{c_p c_r}{c_p + c_r} \qquad (5)$$

The center of resonance on the state plane for $v_p$ and $V_r$ during open stages depends on the variable states when the stage begins. The center of resonance for $i_L$ is still 0, and the center of resonance for $V_{ceff}$ is also 0, yielding the resonant circuit in FIGS. 3A and 3B. This may require that the center of resonances for $v_p$ and $V_r$ be equal. This center of resonance $V_o$ (for both $v_p$ and $v_r$) can be derived from the energy stored in $C_p$ and $C_r$ that does not participate in the open-stage resonance. This can be calculated by subtracting the energy in $C_{eff}$ from the energy in $C_p$ and $C_r$ at the beginning of the open stage as follows, using stage 2 as an example:

$$E_{Ceff} = \frac{1}{2} C_{eff}(v_{p2} - v_{r2})^2 \qquad (6)$$

$$E_{Cp} + E_{Cr} = \frac{1}{2} C_p v_{p2}^2 + \frac{1}{2} C_r v_{r2}^2 \qquad (7)$$

$$E_{Cp} + E_{Cr} - E_{Ceff} = \frac{(C_p v_{p2} + C_r v_{r2})^2}{2(C_p + C_r)} \qquad (8)$$

The center of resonance $V_o$ is the voltage for which the energy in $C_p$ and $C_r$ equal this value:

$$\frac{1}{2} C_p V_o^2 + \frac{1}{2} C_r V_o^2 = \frac{(C_p v_{p2} + c_r v_{r2})^2}{2(C_p + C_r)} \qquad (9)$$

It should be noted that R generally does not affect the center of resonance for either connected or open stages, but it can damp the resonance and therefore dissipates energy during both.

The ideal periodic steady state solution for a given switching sequence can be determined using equations that enforce Conservation of Energy (CoE) and Conservation of Charge (CoC) during the switching stages, assuming the final variable states equal the first variable states and that $v_p$ always reaches the voltage necessary to soft-charge $C_p$. These equations rely only on the state variable values at each switching stage transition point, with their subscript numbers indicating the stage that follows (these numbers correspond to the transition points labeled in FIGS. 3A and 3B). Since $v_p$ is defined for each of these points, there are two total variables for each stage ($v_r$ and $i_L$).

Connected stages have the following CoE constraint, where $v_p$ is defined ($V_p$) based on the PR's terminal connections.

$$C_r(V_{r1} - V_p)^2 + Li_{L1}^2 = C_r(V_{r2} - V_p)^2 + Li_{L2}^2 \qquad (11)$$

Open stages for the PR have both a CoE constraint and a CoC constraint since $v_p$ changes through resonance with the PR's other elements, as represented by the following equations.

$$C_p V_{p2}^2 + C_r v_{r2}^2 + Li_{L2}^2 = C_p V_{p3}^2 + C_r v_{r3}^2 + Li_{L3}^2 \qquad (12)$$

$$C_p(V_{p3} - V_{p2}) = -C_r(V_{r3} - V_{r2}) \qquad (13)$$

These equations can be solved using an analytic solver constrained by the $i_L$ polarity requirements previously discussed, e.g., equations (1)-(4). Six-stage sequences have three connected stages and three open stages, which translate to nine total equations and twelve variables before applying practical constraints.

Once a periodic steady state solution has been obtained, the time duration of each stage can be calculated using the variable states at each stage transition. In some embodiments, this can be done by multiplying the resonant period of a given stage's equivalent circuit times the proportion of its resonant period completed during the stage. For a connected stage, this can involve calculating the angle between the two vectors created by the stage's start and end points-both referenced to the center of resonance ($V_p$, 0)—on the $i_L$ vs. $V_r$ normalized state plane. If a connected stage occurs in only one quadrant of the state plane, that angle can be calculated and used to calculate the stage's time duration as follows:

$$t_1 = \sqrt{LC_r}\left(\tan^{-1}\left(\frac{i_{L2}\sqrt{L/C_r}}{v_{r2} - V_p}\right) - \tan^{-1}\left(\frac{i_{L1}\sqrt{L/C_r}}{v_{r1} - V_p}\right)\right) \qquad (14)$$

Similarly, the time duration of an open stage can be calculated using the angle between the vectors created by the stage's $i_L$ and inductor voltage ($V_p - v_r$) start and end points (both referenced to (0,0)). This takes the following form for an open stage in one quadrant of the $i_L$ vs. $V_p - v_r$ state plane, and can then be multiplied by the $LC_{eff}$ resonant period to calculate time duration:

$$t_2 = \sqrt{LC_{eff}}\left(\tan^{-1}\left(\frac{i_{L3}\sqrt{L/C_{eff}}}{V_p - v_{r3}}\right) - \tan^{-1}\left(\frac{i_{L2}\sqrt{L/C_{eff}}}{V_p - v_{r2}}\right)\right) \qquad (15)$$

If a stage spans more than one quadrant of the state plane, this strategy for calculating stage time duration still applies, however consideration may be given to each quadrant when calculating the angle between the vectors.

FIGS. 5A to 5I illustrate various PR-based converter topologies that can be used, for example, within the systems of FIGS. 1 and 1A. The topologies of FIGS. 5A to 5I require only four unidirectional-blocking switches. While switches are displayed as MOSFETs, other types of active switches (or, in some cases, passive switches) can be used. The types of switches that can be used may be specific to the switching sequences, as discussed further below. The switching sequences and other operational details for these topologies are contained in Table 2 (above) and Table 4 (below). While the topologies of FIGS. 5A to 5I are shown as having voltage source loads, the same or similar topologies can be applied to resistive loads.

Referring to FIG. 5A, according to some embodiments, a topology 500 includes a source 502, a load 504, a PR 506, and switches 508a (S1), 508b (S2), 508c (S3), and 508d (S4). A first switch 508a includes a source terminal connected to a positive terminal of the PR 506 and to a drain terminal of a second switch 502b. Second switch 502b further includes a source terminal connected to a positive terminal of a voltage source load 504 and to a drain of a third switch 508c. A fourth switch 508d includes a source terminal connected to negative terminals of both source 502 and load 504, and a drain terminal connected to a negative terminal of PR 506 and a source terminal of third switch 508c.

FIG. 5B shows a topology 510 that is similar to that of FIG. 5A, but with the source and drain terminals reversed for the first and second switches 508a, 508b.

FIG. 5C shows another topology 520, according to some embodiments. Here, the drain terminal of first switch 508a is connected to the positive terminal of source 502 and to the drain terminal of third switch 508c. Second switch 508b is connected at its drain terminal to the positive terminal of PR 506 and to the source terminal of first switch 508a, and connected at its source terminal to the positive terminal of load 504. Fourth switch 508d is connected at its drain terminal to the negative terminal of PR 507 and to the source terminal of third switch 508c, and connected at its source terminal to the negative terminals of source 502 and load 504.

FIG. 5D shows a topology 530 that is similar to that of FIG. 5C, but with the source and drain terminals reversed for the first and second switches 508a, 508b.

FIG. 5E shows another topology 540, according to some embodiments. Here, first switch 508a has its drain terminal connected to the positive terminal of source 502 and its source terminal connected to the positive terminal of PR 506 and to the drain terminal of second switch 508b. The source terminal of second switch 508b is connected to the negative terminal of source 502, the negative terminal of the load 504, and to the source terminal of fourth switch 508d. Third switch 508c has its source terminal connected to the negative terminal of PR 506 and to the drain terminal of fourth switch 508d, and its drain terminal connected to positive terminal of load 504.

FIG. 5F shows another topology 550, according to some embodiments. Here, first switch 508a has its drain terminal connected to the positive terminal of source 502 and its source terminal connected to the negative terminal of PR 506, and to the drain terminals of both second switch 508b and fourth switch 508d. The source terminal of second switch 508b is connected to negative terminals of both source 502 and load 504. Third switch 508c has its source terminal connected to the source terminal of fourth switch 508d and its drain terminal connected to the positive terminals of both PR 506 and load 504.

FIG. 5G shows another topology 560, according to some embodiments. Here, first switch 508a has its drain terminal connected to the positive terminals of source 502 and PR 506, and its source terminal connected to the source terminal of fourth switch 508d. Second switch 508b has its source terminal connected the negative terminals of both source 502 and load 504, and its drain terminal connected to the drain terminal of fourth switch 508d, to the negative terminal of PR 506, and to the source of third switch 508c. The drain terminal of third switch 508c is connected to the positive terminal of drain 504.

FIG. 5H shows another topology 570, according to some embodiments. Here, first switch 508a has its drain terminal connected to the positive terminal of source 502, and its source terminal connected to the drain terminal of second switch 508b, to the positive terminal of PR 506, and to the drain terminal of third switch 508c. The source terminal of second switch 508b is connected to the negative terminals of source 502, drain 504, and PR 506. The source terminal of third switch 508c is connected to the source terminal of fourth switch 508d. The drain terminal of fourth switch 508d is connected to the positive terminal of drain 504.

FIG. 5I shows another topology 580, according to some embodiments. Here, first switch 508a has its drain terminal connected to positive terminal of source 502 and its source terminal connected to source terminal of fourth switch 508d. Second switch 508b has its source terminal connected to the negative terminals of source 502, load 504, and PR 506. Third switch 508c has its source terminal connected to drain terminal of fourth switch 508d and to positive terminal of PR 506, and its drain terminal connected to the positive terminal of load 504.

TABLE 4

| Topology | Switching Sequence | $t_1$ | $t_2$ | $t_3$ | $t_4$ | $t_5$ | $t_6$ |
|---|---|---|---|---|---|---|---|
| FIG. 5A | $V_{in}$, $V_{in}$-$V_{out}$, $V_{out}$ | S1 S4 | S1 | S1 S3 | * (S3, S2) | S2 S4 | S4 |
|  | $V_{in}$, Zero, $V_{out}$ | S1 S4 | * (S1, S3) | S2 S3 | S2 | S2 S4 | S4 |
|  | $V_{in}$-$V_{out}$, Zero, $V_{out}$ | S1 S3 | S3 | S2 S3 | S2 | S2 S4 | * (S4, S1) |
| FIG. 5B | $V_{in}$, $V_{in}$-$V_{out}$, Zero | S1 S4 | S1 | S1 S3 | S3 | S2 S3 | * (S2, S4) |
|  | $V_{in}$, Zero, $V_{out}$ | S1 S4 | * (S1, S3) | S2 S3 | S2 | S2 S4 | S4 |
| FIG. 5C | $V_{in}$, Zero, $V_{out}$ | S1 S4 | S1 | S1 S3 | * (S3, S2) | S2 S4 | S4 |
|  | $V_{in}$-$V_{out}$, -$V_{out}$, Zero** | S2 S3 | S2 | S2 S4 | * (S4, S1) | S1 S3 | S3 |
| FIG. 5D | $V_{in}$, $V_{out}$-$V_{in}$, $V_{out}$ | S1 S4 | * (S1, S3) | S2 S3 | S2 | S2 S4 | S4 |
|  | $V_{in}$, Zero, $V_{out}$-$V_{in}$ | S1 S4 | S1 | S1 S3 | S3 | S2 S3 | * (S2, S4) |
|  | $V_{in}$, Zero, $V_{out}$ | S1 S4 | S1 | S1 S3 | * (S3, S2) | S2 S4 | S4 |

TABLE 4-continued

| Topology | Switching Sequence | $t_1$ | $t_2$ | $t_3$ | $t_4$ | $t_5$ | $t_6$ |
|---|---|---|---|---|---|---|---|
| FIG. 5E | $V_{in}$, $V_{in}$-$V_{out}$, Zero | S1 S4 | S1 | S1 S3 | * (S3, S2) | S2 S4 | S4 |
| | $V_{in}$, -$V_{out}$, Zero | S1 S4 | * (S1, S3) | S2 S3 | S2 | S2 S4 | S4 |
| | $V_{in}$-$V_{out}$, -$V_{out}$, Zero | S1 S3 | S3 | S2 S3 | S2 | S2 S4 | * (S4, S1) |
| FIG. 5F | $V_{in}$-$V_{out}$, -$V_{out}$, Zero | S1 | — | S2 | — | S3 | — |
| FIG. 5G | $V_{in}$, $V_{in}$-$V_{out}$, Zero | S2 | — | S3 | — | S1 | — |
| FIG. 5H | $V_{in}$, Zero, $V_{out}$ | S1 | — | S2 | — | S3 | — |
| FIG. 5I | $V_{in}$, Zero, $V_{out}$ | S1 | — | S2 | — | S3 | — |

Table 4 shows switching sequences that can be used in conjunction with the topologies of FIGS. 5A to 5I. Switch numbers (e.g., "S1," "S2," etc.) in the table indicate which switches are "on" during the corresponding stage of the switching sequence for a given topology. For a six-stage sequence, (*) indicates that all switches are off. If the stage is split into two sections for achieving soft switching, (*) indicates that one switch from the previous stage is left on until the transition point between the two sections (the first switch designated in the parenthesis). At the transition point, that switch turns off and another switch (the second switch in the parenthesis) from the next stage turns on. (**) requires opposite polarity of all switching sequence voltages. These six-stage switching sequences may be extended to eight-stage sequences using certain topologies, as discussed further below.

Figure 4B:
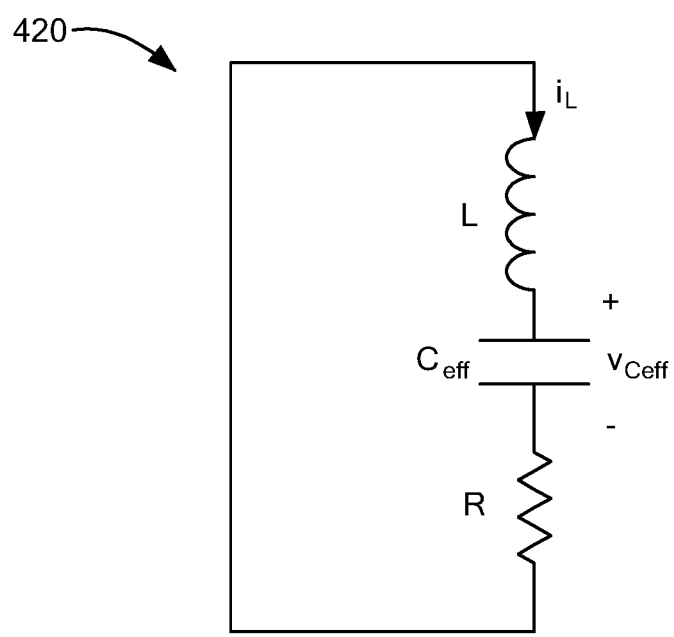
FIG. 4B shows a resonant circuit for an open stage of switching sequence.
Figure 6A:
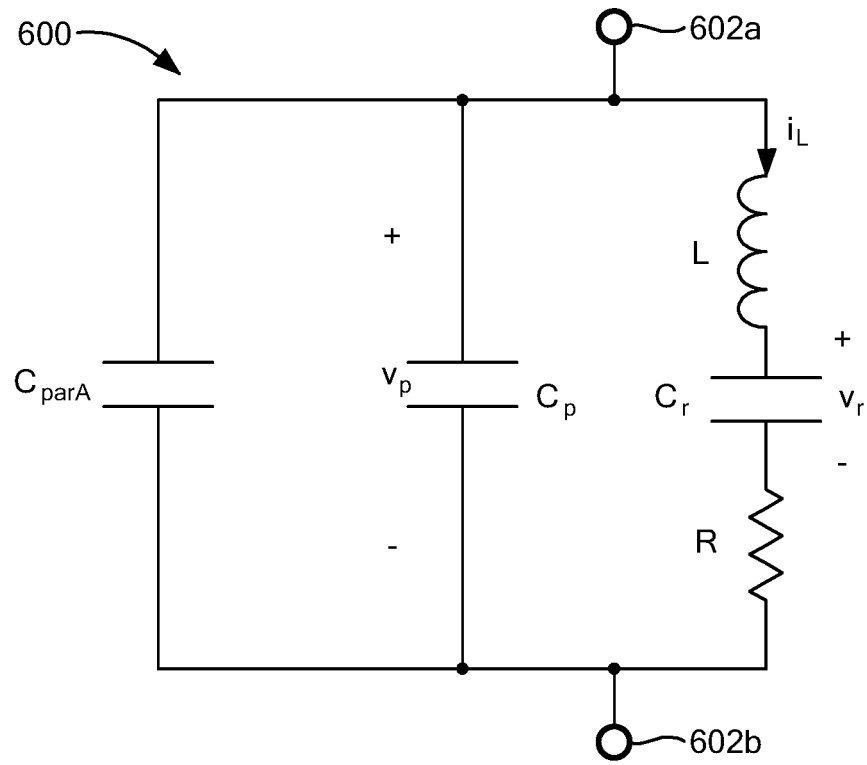
FIG. 6A is a schematic diagram of a resonant circuit having parasitic capacitances at one PR terminal.
Figure 6B:
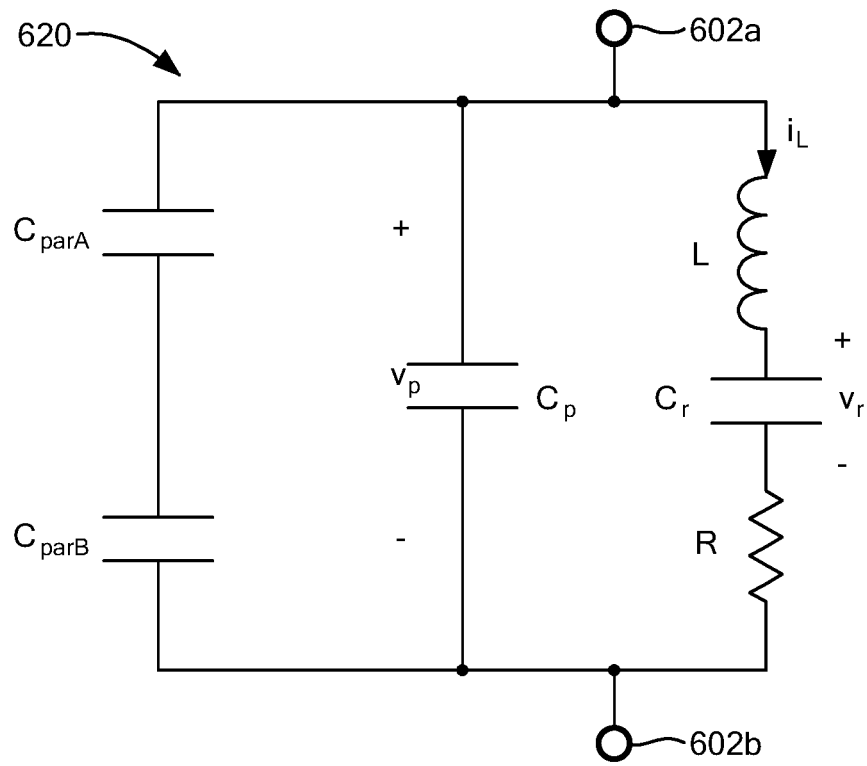
FIG. 6B is a schematic diagram of a resonant circuit having parasitic capacitances at both PR terminals.

Referring to FIGS. 6A and 6B, in some embodiments, there may be additional parasitic capacitances (e.g., switch capacitances) between one or both PR terminals 602a, 602b and AC ground. These capacitances do not affect resonant behavior during connected stages, but they can affect resonance of open stages. FIG. 6A shows a resulting resonant circuit 600 when parasitic capacitances are present at one terminal of the PR. FIG. 6B shows a resulting resonant circuit 620 when parasitic capacitances are present at both terminals of the PR, where $C_{parA}$ and $C_{parB}$ are the sums of all capacitances between PR terminals 602a or 602b (respectively) and AC ground. It is appreciated that the circuits in FIGS. 6A and 6B can be reduced to the resonant circuit 420 of FIG. 4B by recalculating $C_{eff}$ considering $C_{parA}$ and $C_{parB}$.

The periodic steady state system of equations described above does not consider the effects of R (as illustrated in the BVD model of FIG. 2A). Adding power dissipation terms to the CoE equations requires time-domain integration of $i_L^2$ which can be complex to implement using only the transition point state variables in the existing system of equations. Instead, if an exact periodic steady state solution considering R is desired, the time-domain system of differential equations governing the PR's states can be solved symbolically for each stage (producing solutions with complex exponentials) and assembled into a system of equations representing the whole switching sequence. Then, this system of equations can be solved numerically using the ideal periodic steady state solution as its starting point, which is vital for reliable convergence.

Connected stages can be described by the following differential equations, where $v_p$ is constant ($V_p$):

$$\frac{dv_r}{dt} = \frac{i_L}{C_r} \quad (16)$$

$$\frac{di_L}{dt} = \frac{v_p - v_s - Ri_L}{L} \quad (17)$$

Open stages have these same equations plus the following additional equation to describe the change in $v_p$. $C_p$ in this equation may be adjusted to consider parasitic capacitance if needed.

$$\frac{dv_p}{dt} = \frac{-i_L}{C_p} \quad (18)$$

Like in the ideal case, $v_p$, $v_r$, and $i_L$ resonate to the next stage's initial values. With two equations for each connected stage and three equations for each open stage, this time-domain system has fifteen equations for a six-stage switching sequence. Its unknowns are the same transition point variable states plus the six time durations of each stage, amounting to eighteen (18) total variables. This method for obtaining an exact periodic steady state solution considering R has been used to calculate PR efficiencies and switching times as described herein.

Degrees of freedom in the periodic steady state system of equations can be used to apply constraints for desired operation. In some embodiments, constraints can be selected to improve performance by requiring only positive instantaneous power transfer and, in some cases, zero-voltage soft switching of the transistors used to implement the switches.

Constraining for only positive instantaneous power transfer both from the source and to the load removes loss due to circulating currents between the PR and the source/load system. With unidirectional voltage blocking switches, this constraint requires $v_p$ to resonate to exactly its desired voltage, without overshoot, during open stages before the highest and lowest $V_p$ connections. Also, $i_L$ must change polarity exactly when $v_p$ reaches the desired voltage for those stages as illustrated in the state planes 300 and 320 of FIGS. 3A and 3B. This defines the $i_L$ zero crossing point for one or both halves of the resonant cycle.

Some switching sequences have a zero stage either during or surrounding an $i_L$ zero crossing, so the definition of the exact crossing point does not affect instantaneous power transfer to or from the source/load system. In these cases, the zero stage itself can also be constrained for only single direction current flow to prevent unnecessary circulating current, with the polarity of $i_L$ determined by the charge that must be transferred for charge balance across the cycle. This allows a second $i_L$ zero crossing point to be defined for cases with only one constraint for positive instantaneous power transfer.

Thus, the two $i_L$ zero crossing points can be defined for all switching sequences, and resulting $i_L$ variable constraints are summarized in Table 2. Such constraints reduce the degrees of freedom in the periodic steady state system of equations to only one, which can be used to modulate power.

The viable PR-based converter implementations and switching sequences summarized in Table 2 facilitate soft charging of the PR, but not necessarily zero voltage switching (ZVS) of the switches. Topologies that have only one floating node (i.e., one terminal of PR is tied to the source/load system) inherently require ZVS in order to soft charge the PR since $C_p$ and all the switch capacitances exist between the same floating node and a fixed DC voltage. Thus, ZVS naturally occurs across the entire six-stage switching cycle for the topologies shown in FIGS. 5F to 5I.

For a six-stage switching cycle, topologies that have two floating nodes (i.e., neither terminal of PR is tied to the source/load system as in topologies of FIGS. 5A to 5E) may require at least one open stage during which both floating nodes change voltage. Barring specific conversion ratios, the necessary voltage change at each of the two nodes during this open stage tends to be different. In some instances, $i_L$ changes both node voltages in their respective correct directions, but the time durations required for each to achieve ZVS are mismatched. In most cases, the voltage changes needed at the two nodes require opposite polarities of $i_L$.

Soft-switching can be provided (and ideally ensured) with topologies shown in FIGS. 5A to 5E if the open stage during which both nodes change voltage is split into two sections. In cases where the polarity of $i_L$ changes both node voltages in the correct direction, this two-part open stage may be realized by allowing both nodes to change at the same time and timing the switch turn-ons differently (or allowing some diode conduction) to make up for the difference in charge transfer needed at each node. For the general case, this two-part open stage can be used to change the two node voltages one at a time, with a $V_p$ constraint at the transition point. This way, one of the PR terminals is always clamped at a DC voltage during the open stage, and the transition between the two parts of the open stage can take place at a zero crossing for $i_L$ if the two nodes require opposite $i_L$ polarities.

Figure 7A:
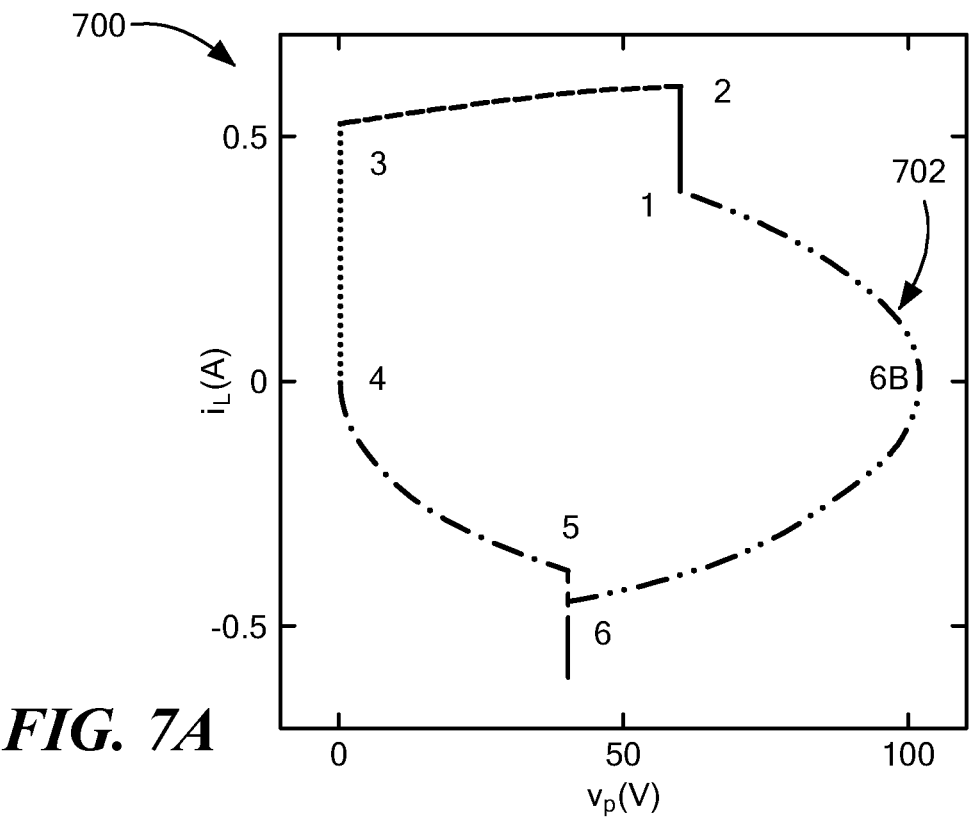
FIGS. 7A and 7B are state plane diagrams illustrating a soft-switched six-stage switching sequence that can be used with a PR-based converter, according to some embodiments.
Figure 7B:
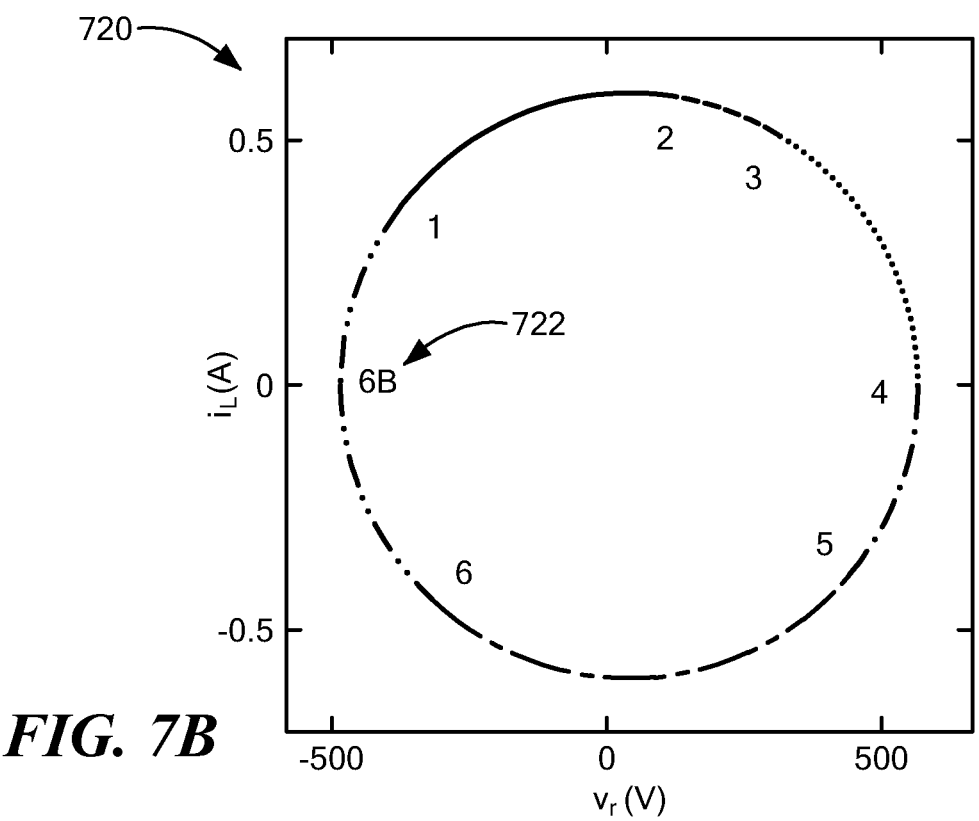

FIGS. 7A and 7B illustrate this concept with the soft-switched version of the switching sequence: $V_{in}$–$V_{out}$, Zero, $V_{out}$. In this example, $V_{in}$=100 $V_p$ $V_{out}$=40 $V_p$ $P_{out}$=10 W and the PR parameters may be the same as or similar to the parameters as shown in Table 3. FIG. 7A shows an $i_L$ vs. $v_p$ plane 700 and FIG. 7B shows an $i_L$ vs. $V_r$ plane 720. In FIGS. 7A and 7B, each stage is denoted by a different line style and with a stage number label (e.g., "1," "2", "3," etc.) positioned at the starting point of the stage. However, this implementation must resonate $v_p$ up to $V_{in}$ to achieve ZVS turn-on of the switch connecting to $V_{in}$ (around the points labeled 702 and 722) before reducing to $V_{in}$–$V_{out}$ to achieve ZVS turn on of the switch to $V_{out}$ during its two-segment sixth stage.

Altering an open stage in this way to achieve soft switching in the topologies of FIGS. 5A to 5E may require modification of the current constraints for all-positive instantaneous power transfer with unidirectional blocking switches. These modifications are displayed in Table 2 along with the $V_p$ constraint for the $i_L$ zero crossing between the open stage's two parts (in Table 2, subscript "B" indicates this transition point).

In the topologies of FIGS. 5A to 5I, switches are shown as active switches, e.g., MOSFETs. However, in some embodiments, at least one switch in a given topology can be replaced with a diode to reduce control complexity (e.g., to reduce complexity within controller 108 of FIG. 1). There are two zero crossings for $i_L$ each cycle, and a switch that turns off at a zero crossing to satisfy the $i_L$ constraints in Table 2 can be implemented with a diode if it also blocks voltage in the appropriate direction. This is the case for one switch each in FIGS. 5F to 5I, reducing the number of active switches to two (counting the bidirectional blocking pair as one switch) for these topologies. The topologies of FIGS. 5A, 5B, 5D, and 5E can also be reduced to only two active switches for certain switching sequences, with the other two switches realized with diodes. These implementations provide (and ideally ensure) soft switching with the current constraints in Table 2, reducing the complexity imposed by those constraints.

All topology and switching sequence combinations that can be implemented using only two active switches are distinguished with an asterisk (*) next to their required current constraints in Table 2.

It may be desirable to realize PR-based converters that achieve efficiencies competitive with existing converter architectures. PRs tend to have very high mechanical quality factors $Q_m$, which serves as a figure of merit for the PR's mechanical resonance. The PR's efficiency is dependent on $Q_m$ but also how much of its stored energy can be transferred to the output per cycle, which varies by implementation.

Thus, PR energy conversion metrics can be calculated and compared for proposed implementations using the exact periodic steady state solution considering R, as described above in conjunction with equations (16)-(18).

Figure 8A:
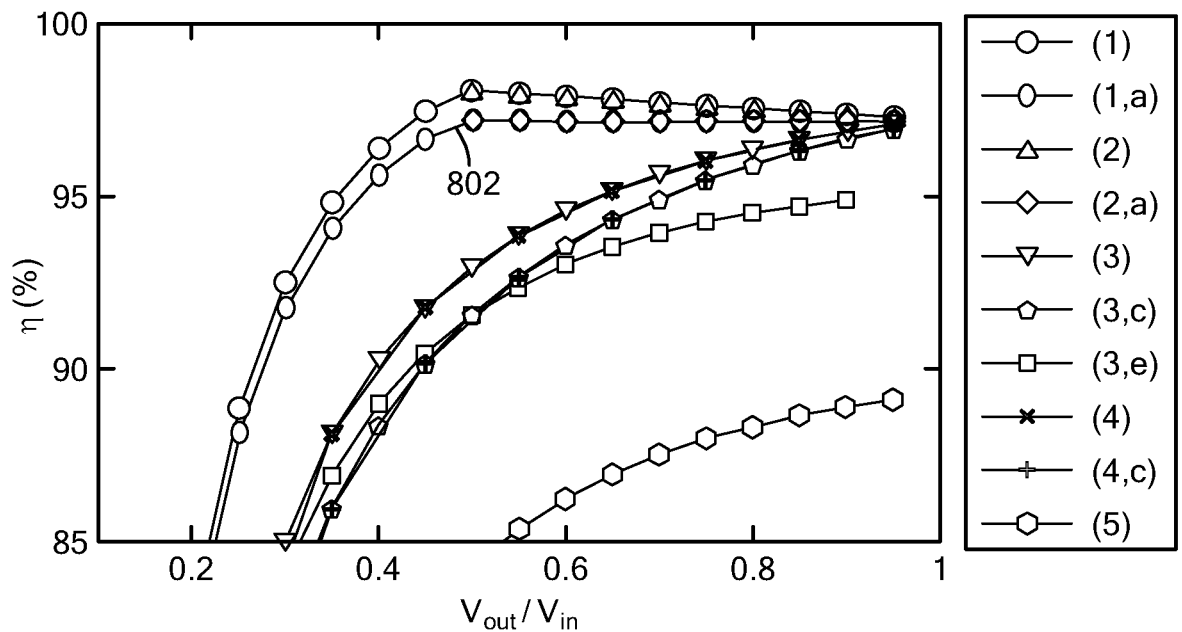
FIGS. 8A and 8B are plot diagrams showing energy transfer efficiency as a function of voltage conversion ratio for a given PR, according to some embodiments.
Figure 8B:
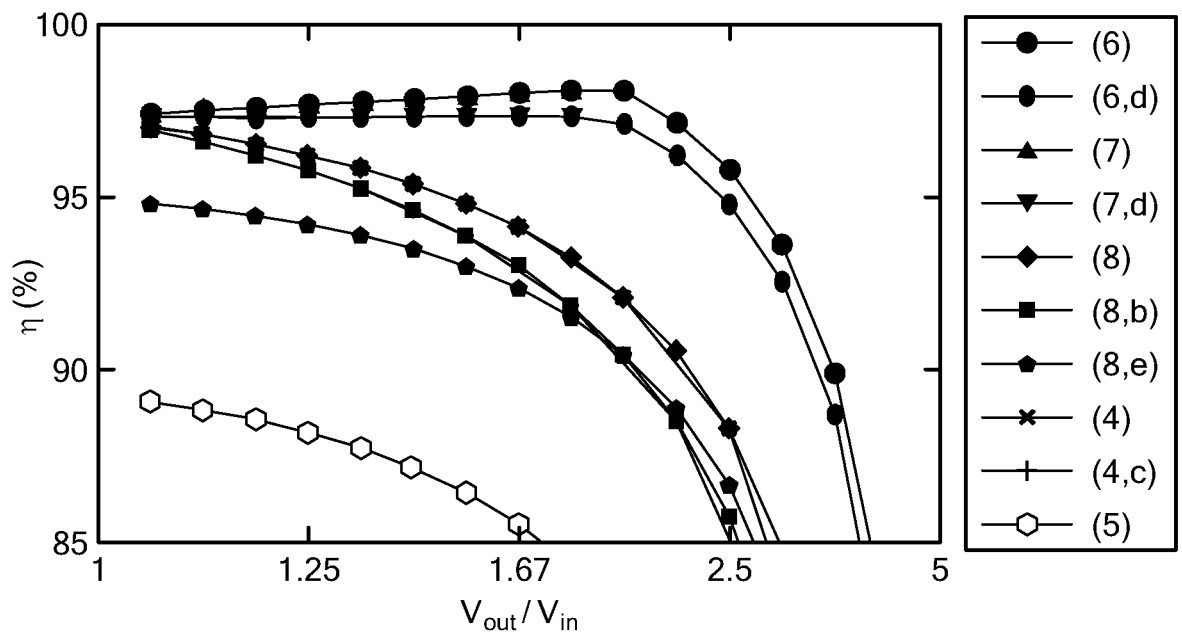

FIGS. 8A and 8B show energy transfer efficiency as a function of voltage conversion ratio for a given PR (not the full converter) when used in each of the configurations listed in Table 2 with a fixed load. FIG. 8A shows plots for step down design, and FIG. 8B shows plots for step up designs. These illustrative calculations may be based on the PR parameters in Table 3. In FIGS. 8A and 8B, switching sequences are organized by line style and number, and modifications for soft switching are distinguished by marker shape and topology letter. The legend codes point to each efficiency curve's specific implementation and correspond to the codes next to the operation constraints for $i_L$ in the third and fifth columns of Table 2.

As illustrated in FIGS. 8A and 8B, there can be significant variability between implementations in terms of energy transfer capability. High efficiency may tend to be correlated with switching sequences that have: (1) less charge transfer during open stages (i.e. require a smaller range for $V_p$ across the switching cycle); (2) a stage providing direct energy transfer from $V_{in}$ to $V_{out}$; and/or (3) no zero stage, or minimal charge transfer during zero stages.

Switching sequences that produce shifted versions of the same $i_L$ profile (e.g., shifted by $V_p$, rotated by 180°, and/or inverted) result in the same PR efficiencies. Switching sequences $V_{in}$, $V_{in}$–$V_{out}$, $V_{out}$ and $V_{in}$–$V_{out}$, Zero, $V_{out}$ are an example of this for $2V_{out}$>$V_{in}$>$V_{out}$. These switching sequences have the same state planes rotated by 180° and $V_p$, —shifted by $V_{out}$, which translates to the same energy loss per cycle. These two switching sequences have the highest efficiencies for the step down case, $V_{in}$–$V_{out}$, Zero, $V_{out}$ produces estimated efficiencies of more than 90% with this particular PR for $V_{out}/V_{in}$>0.3. FIGS. 8A and 8B also shows that the modifications required for ZVS in topologies FIGS. 5A to 5E result in a slight efficiency drop, which can be attributed to the additional charge transfer (and $V_p$ swing) required of the two-part open stage. Thus, a tradeoff exists between this PR efficiency drop and the loss that would be incurred by hard switching for implementations requiring modification.

These PR efficiency values may be considered as simply an upper bound for realistic operation; these calculations assume switch non-idealities to be negligible compared to those of the PR, and they also assume perfect switching times (for ZVS, energy balance, etc.) according to the periodic steady state solution. However, these calculations illustrate energy transfer capabilities of different implementations that can be used to compare and select between them, according to some embodiments.

Figure 9:
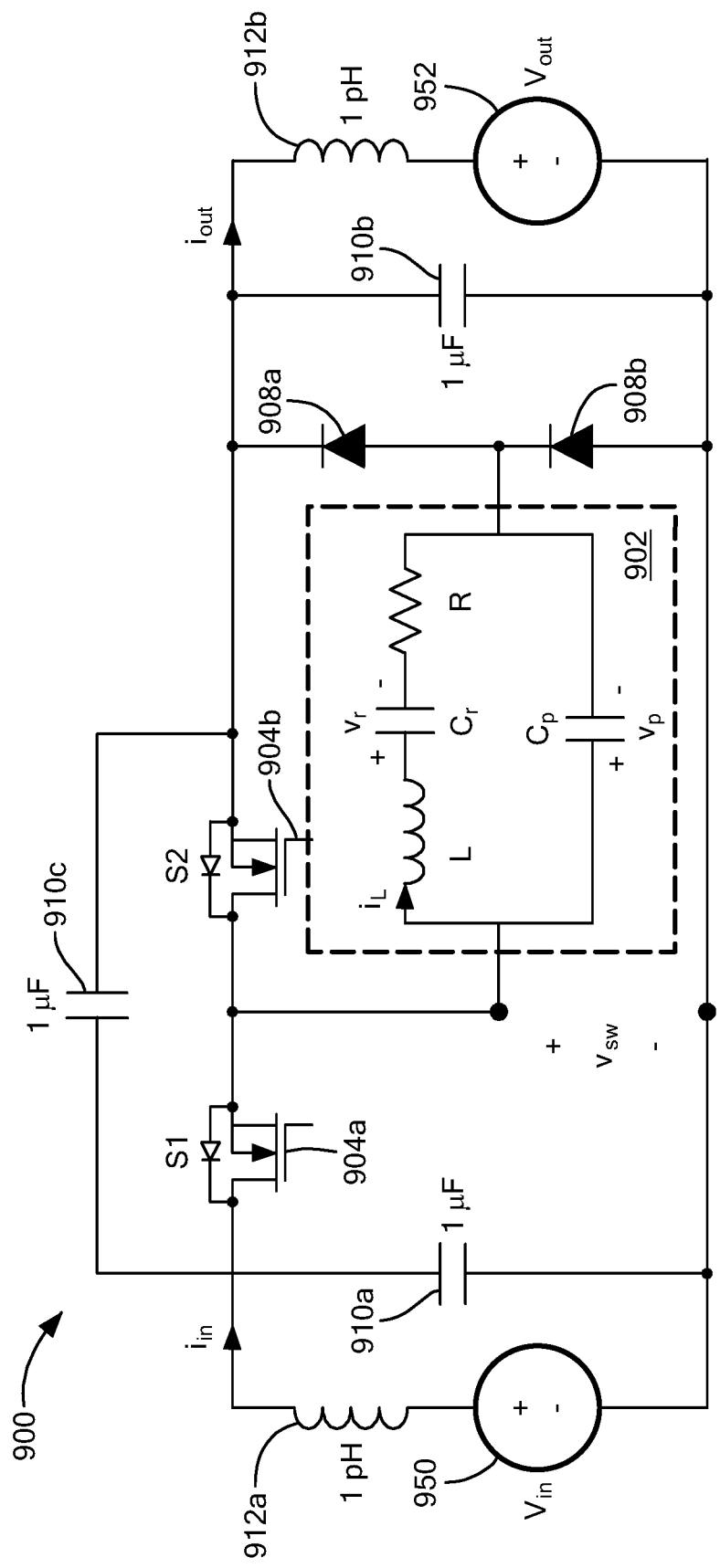
FIG. 9 is a schematic diagram showing an implementation of a PR-based converter based on the topology in FIG. 5A, according to some embodiments.

FIG. 9 shows an implementation of a PR-based converter 900 based on topology in FIG. 5A, according to some embodiments. The illustrative converter 900 includes a PR 902, a first active switch 904a, a second active switch 904b, a first diode 908a, a second diode 908b, a first capacitor 910a, a second capacitor 910b, a third capacitor 910c, a first inductor 912a, and a second inductor 912b, which components can be connected together as shown or in any other suitable manner. Active switches 904a, 904b may be provided as MOSFETs and, in some embodiments, as EPC 2037 GaN FETs. In some embodiments, diodes 908a, 908b may be provided as DFLS160 Schottky diodes.

Converter 900 can be connected to a source 950 and a load 952, as shown. Load 952 can be a voltage source load or a resistive load. PR 902 can have the parameters that are the same as or similar to those shown in Table 3.

Converter 900 may be operated using the $V_{in}$-$V_{out}$, Zero, $V_{out}$ switching sequence. As can be seen by plot 802 in FIG. 8A, this switching sequence results in relatively desirable efficiency for step down designs, and its soft-switched version can be reduced to just two active switches for $V_{in}$>2$V_{out}$. In some embodiments, converter 900 can achieve an input-to-output (whole converter) efficiency of about 93.0%.

Figure 10:
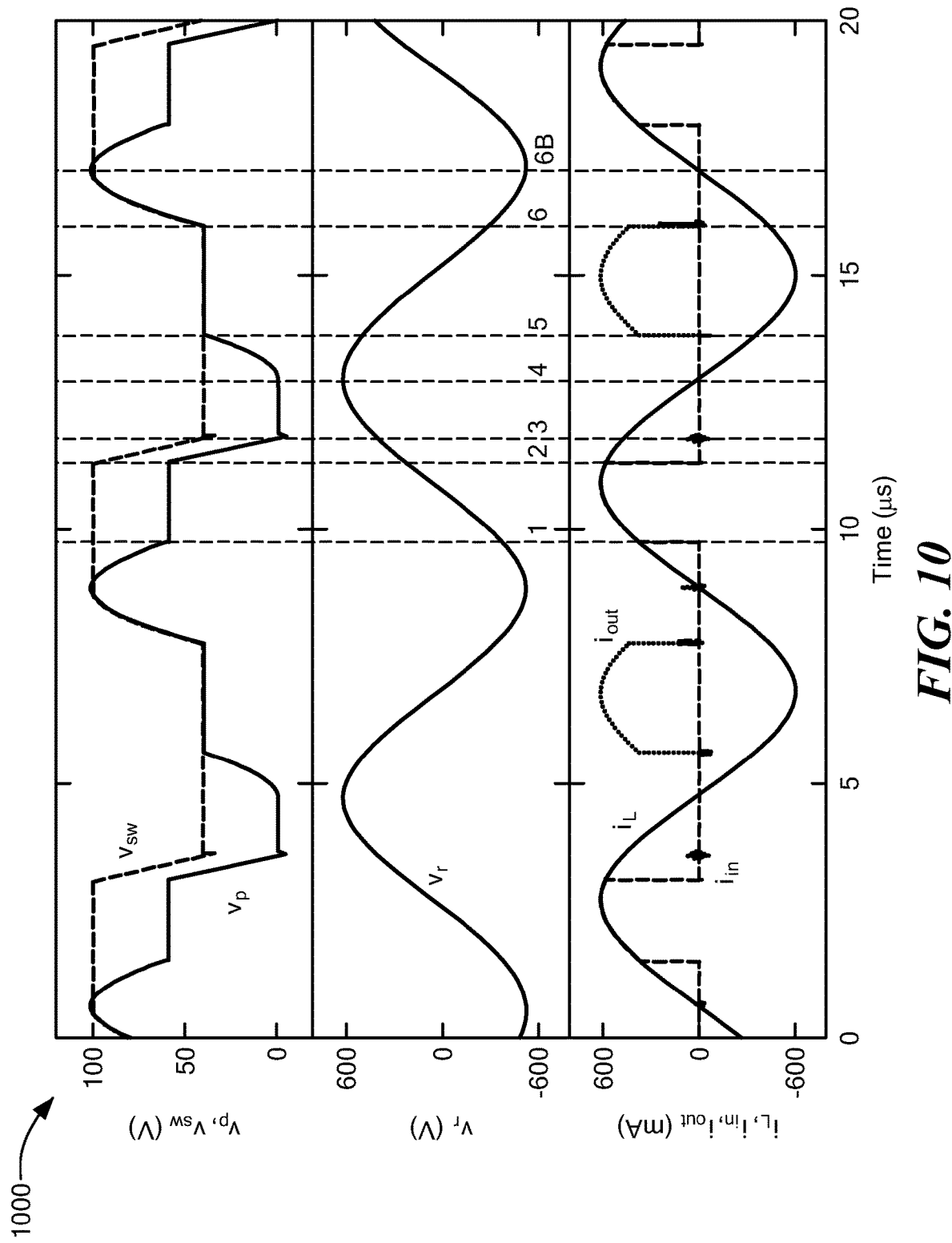
FIG. 10 shows a series of time-domain waveforms that may be generated using the converter implementation.

FIG. 10 shows a series of time-domain waveforms 1000 that may be generated using the converter implementation 900 of FIG. 9 using the $V_{in}$-$V_{out}$, Zero, $V_{out}$ switching sequence. The switching times can be calculated from the periodic steady state solution considering R and parasitic capacitance as described above. For $V_{in}$=100 $V_p$ $V_{out}$=40 V, and $P_{out}$=10 W, the PR's states follow the trajectories in FIGS. 7A, 7B and yield the time-domain waveforms in FIG. 10. Numbers "1", "2", . . . "6B" in FIG. 10 correspond to the state transition points in FIGS. 7A, 7B. These waveforms demonstrate both soft-charging of $C_p$ and soft-switching of the FETs as desired, and the waveforms for $i_{in}$ and $i_{out}$ show positive instantaneous power transfer during all stages.

Figure 11A:
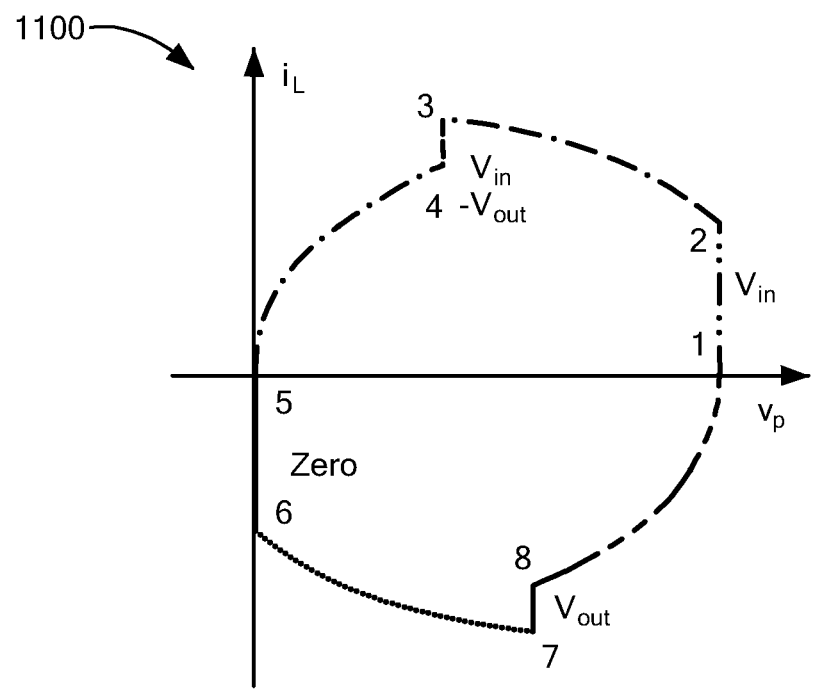
FIGS. 11A and 11B are state plane diagrams illustrating an eight-stage switching sequence can be used with a PR-based converter, according to some embodiments.

Referring to FIGS. 11A and 111B, as discussed previously, achieving ZVS with a six-stage switching sequence in topologies with two switch nodes (FIGS. 5A to 5E) may require splitting an open stage into two sections, allowing the two terminal nodes to change voltage sequentially. The infinitesimal-duration boundary between these two sections is constrained at a defined $V_p$, which suggests the potential for a fourth connected stage at that point (creating an eight-stage switching sequence). Notably, if all modified six-stage switching sequences for a given topology in FIGS. 5A to 5E are expanded to include this specific fourth connected stage, all sequences yield the same eight-stage switching sequence (same stages in the same order). Thus, all six-stage sequences proposed herein for a given topology are different segments of the same eight-stage sequence.

It is appreciated herein that the relationship between a topology's six-stage and eight-stage sequences suggests a multi-dimensional space of operating modes with varying durations for each of the four potential connected stages. The six-stage sequences are the boundaries for this space, and the eight stage sequence spans from one boundary to another. An efficiency comparison of six-stage switching sequences may compare the extremes of this space and points to the corners of it that most effectively use the PR. Intentional use of the eight-stage sequence can provide added flexibility for tuning and an additional degree of freedom for regulation while maintaining soft charging, ZVS, and positive instantaneous power flow.

To search for other potential eight-stage sequences, sequences for each topology structure can be enumerated, yielding eight sequences for each of the three structures (24 total), wherein FIGS. 5A and 5B are considered as having the same topology structure, as well as FIGS. 5C and 5D. Table 5 shows three eight-stage sequences, and the corresponding topologies, that can result after downselection for one PR resonant cycle and energy/charge balance. Switch numbers (e.g., "S1," "S2," etc.) in Table 5 indicate which switches are "on" during the corresponding stage of the switching sequence for a given topology.

TABLE 5

| Topology | Switching Sequence | $t_1$ | $t_2$ | $t_3$ | $t_4$ | $t_5$ | $t_6$ | $t_7$ | $t_8$ |
|---|---|---|---|---|---|---|---|---|---|
| FIGS. 5A, 5B | $V_{in}$, $V_{in}$-$V_{out}$, Zero, $V_{out}$ | S1 S4 | S1 | S1 S3 | S3 | S2 S3 | S2 | S2 S4 | S4 |
| FIGS. 5C, 5D | $V_{in}$, Zero, $V_{out}$-$V_{in}$, $V_{out}$ | S1 S4 | S1 | S1 S3 | S3 | S2 S3 | S2 | S2 S4 | S4 |
| FIG. 5E | $V_{in}$, $V_{in}$-$V_{out}$, -$V_{out}$, Zero | S1 S4 | S1 | S1 S3 | S3 | S2 S3 | S2 | S2 S4 | S4 |

Figure 11B:
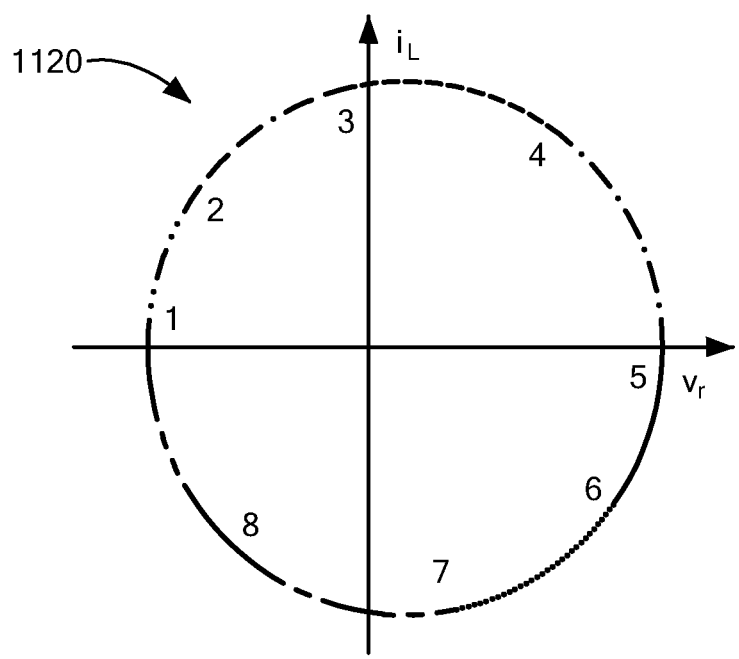

FIGS. 11A and 11B show state planes for the eight-stage switching sequence $V_{in}$, $V_{in}$-$V_{out}$, Zero, $V_{out}$, with $V_{in}$=100 $V_p$ $V_{out}$=60 $V_p$ $P_{out}$=6 W, and the PR parameters of Table 3. FIG. 11A shows an $i_L$ vs. $v_p$ plane 1100, and FIG. 11B showing an $i_L$ vs. $v_r$ plane 1120. Each stage is denoted by a different line style and with a stage number label (e.g., "1," "2", "3," etc.) positioned at the starting point of the stage.

The eight-stage switching sequence $V_{in}$, $V_{in}$-$V_{out}$, Zero, $V_{out}$ can be demonstrated by traversing the region between $V_{in}$-$V_{out}$, Zero, $V_{out}$ and $V_{in}$, $V_{in}$-$V_{out}$, $V_{out}$ while keeping $V_{in}$, $V_{out}$, and $P_{out}$ constant. This can include incrementally increasing and decreasing the zero stage and $V_{in}$ stage time durations and adjusting frequency to maintain a tuned operating point.

Figure 12A:
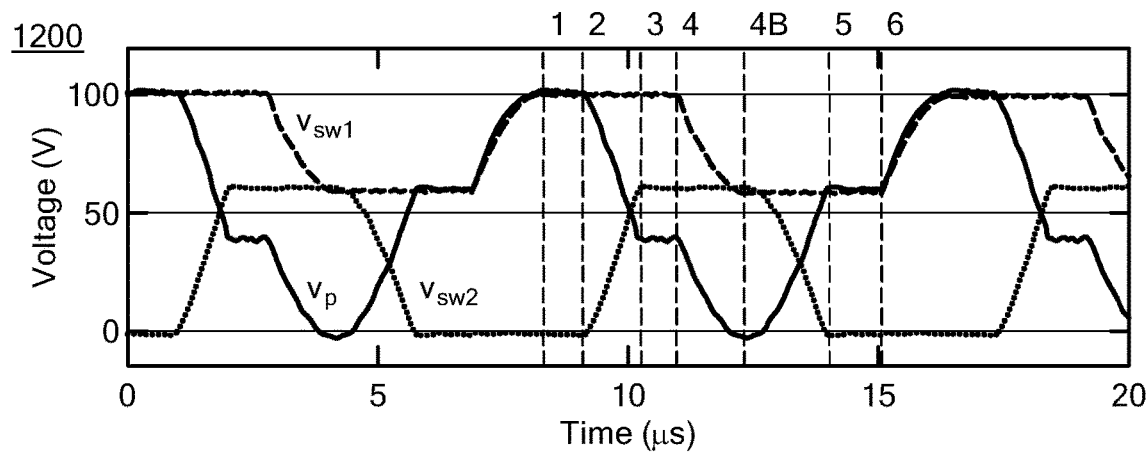
FIGS. 12A, 12B, and 12C shows a series of time-domain waveforms comparing an eight-stage switching sequence to six-stage switching sequences.
Figure 12B:
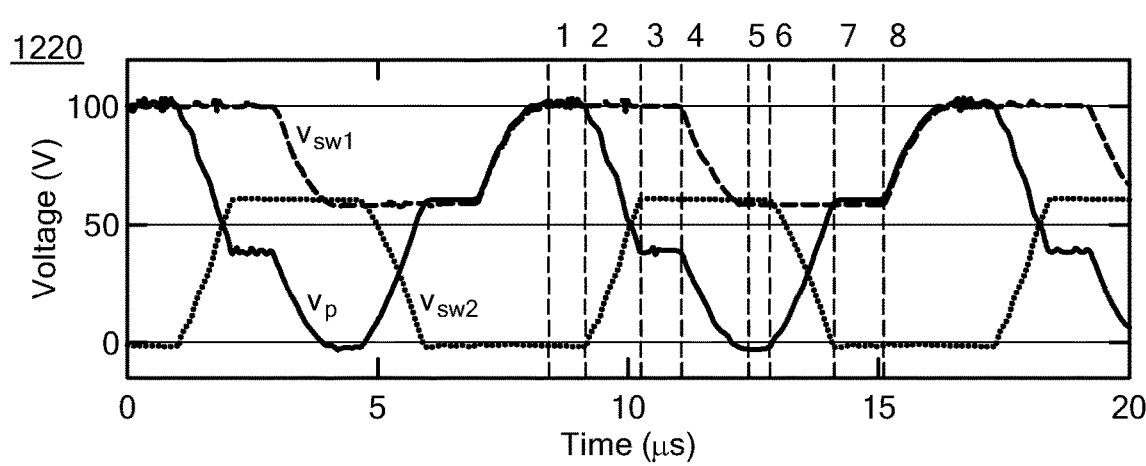
Figure 12C:
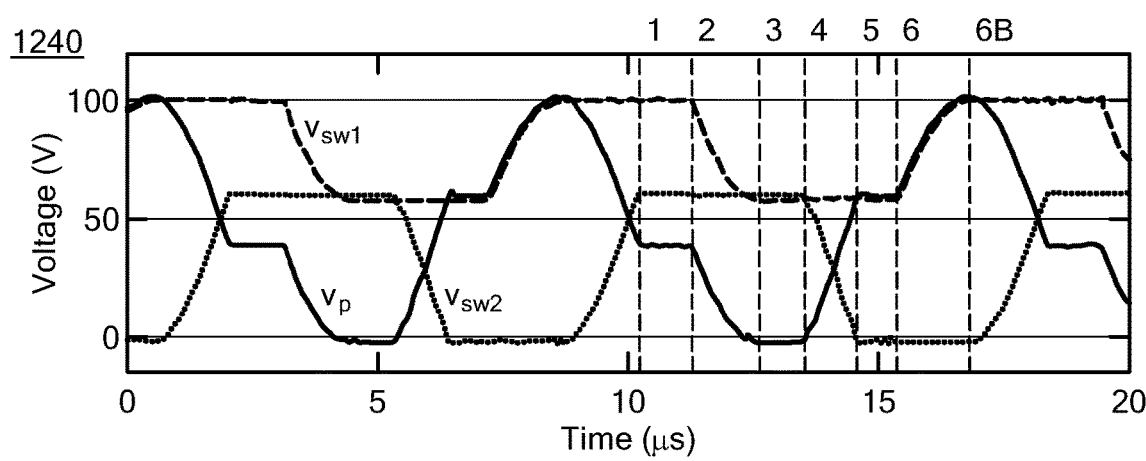

FIGS. 12A, 12B, and 12C shows a series of time-domain waveforms comparing an eight-stage switching sequence to six-stage switching sequences. FIG. 12A shows a waveform 1200 corresponding to the six-stage switching sequence $V_{in}$, $V_{in}$-$V_{out}$, $V_{out}$. FIG. 12B shows a waveform 1220 corresponding to the eight-stage switching sequence $V_{in}$, $V_{in}$-$V_{out}$, Zero, $V_{out}$. FIG. 12C shows a waveform 1240 corresponding to the six-stage switching sequence $V_{in}$-$V_{out}$, Zero, $V_{out}$. Numbers "1", "2", . . . "8" in FIG. 12B correspond to the state transition points in FIGS. 11A, 11B. The waveforms 1200, 1220, 1240 may all correspond to the same operating point, namely $V_{in}$=100 $V_p$ $V_{out}$=60 $V_p$ $P_{out}$=4 W, and the parts in Table 6 (it should be appreciated that some or all of these parts can be used in other disclosed embodiments).

TABLE 6

| Component | Part |
|---|---|
| PR | APC INTERNATIONAL part 790 |
| Active Switch | EPC 2019 GaN FET |

TABLE 6-continued

| Component | Part | |
|---|---|---|
| Schottky Diode | ON SEMICONDUCTOR NRVSTA4100 | |
| Gate Driver | TEXAS INSTRUMENTS UCC27611 | 5 |

These waveforms of FIGS. 12A-12C exhibit ZVS, soft charging of the PR, and all-positive instantaneous power transfer. The eight-stage region between the two six-stage sequences can provide similar operating behavior as with six-stage sequences, but with an added degree of control flexibility. The operating points of FIGS. 12A-12C engage all four of the converter's active switches (including the six-stage sequences for direction comparison) and may result in efficiencies of greater than 99%.

Figure 13:
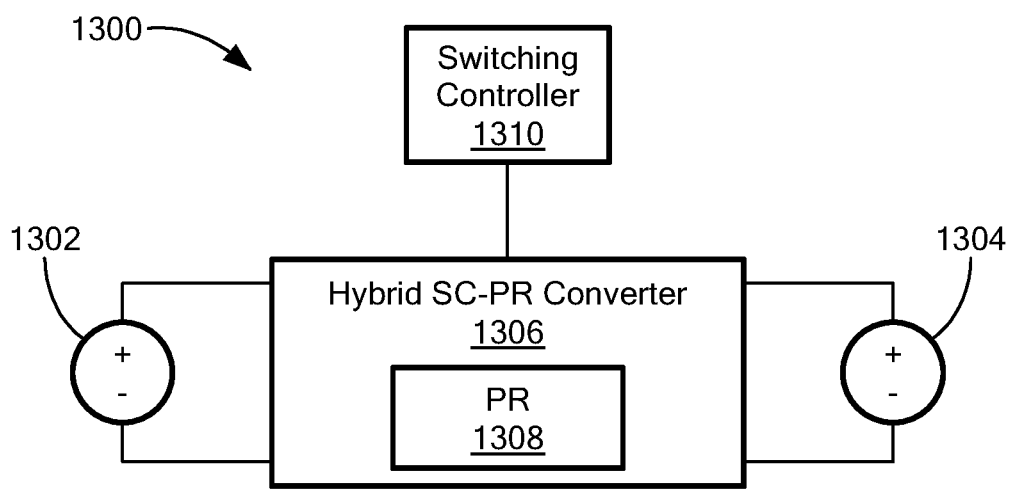
FIG. 13 is a block diagram of a system having a hybrid SC-PR converter, according to some embodiments.

Referring to FIG. 13, it is appreciated herein that a converter that is a hybrid of a switched capacitor (SC) converter and a PR-based converter can significantly lower the voltage stress on the PR for high step-down conversion ratios (e.g., a 4:1 ratio). Thus, according to some embodiments, a system 1300 can include a source 1302, a load 1304 (e.g., a voltage source load or a resistive load), and a hybrid SC-PR converter 1306 that includes a PR 1308 as an energy transfer element (in additional to the switched capacitors). The system 1300 can also include a switching controller 1310 to control switches within converter 1306 according to a selected switching sequence.

Figure 13A:
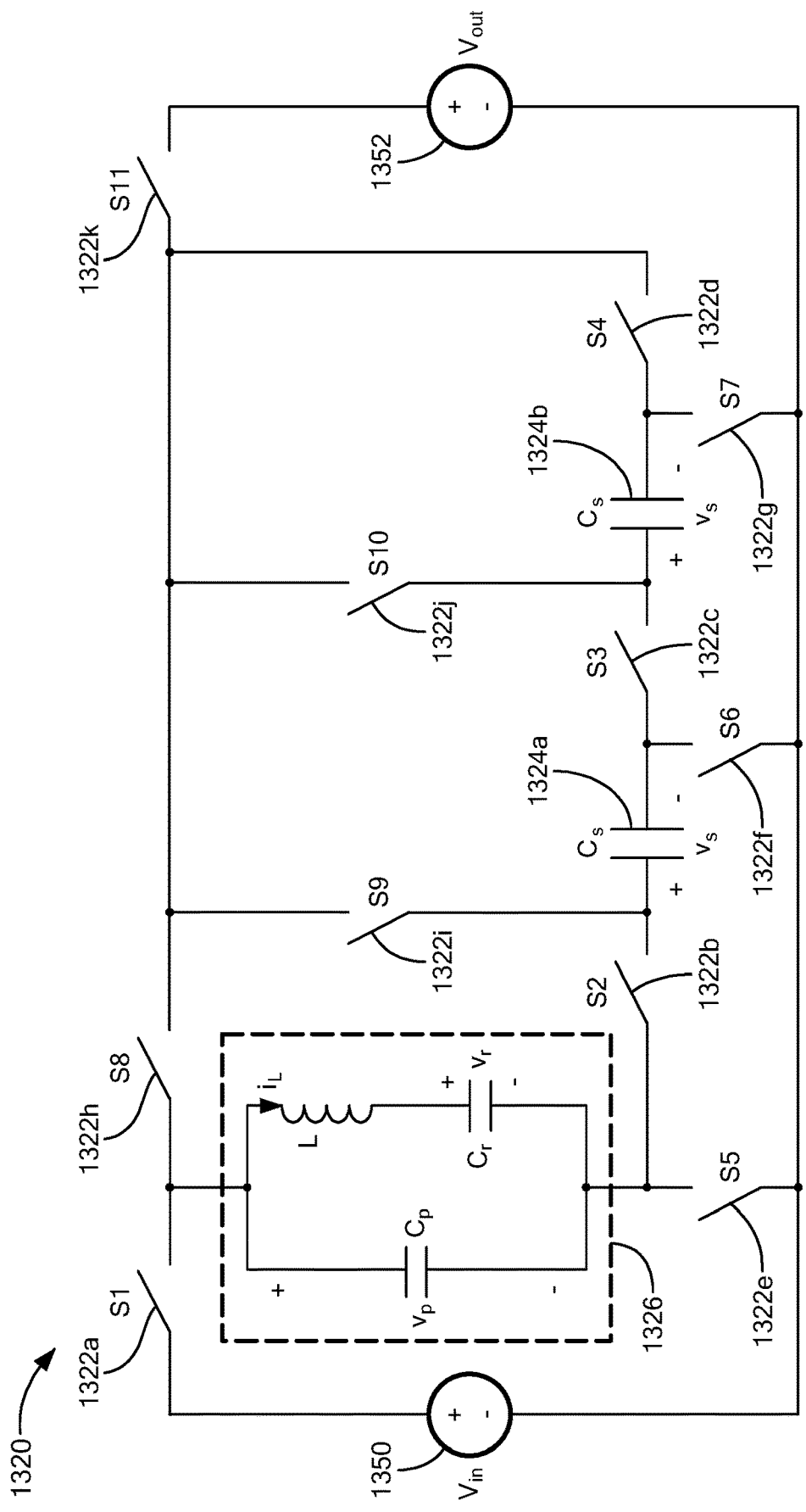
FIG. 13A is a schematic diagram of a hybrid SC-PR converter than can be implemented within the system of FIG. 13, according to some embodiments.

FIG. 13A shows an example of a hybrid SC-PR converter 1320 that can be implemented within the system 1300 of FIG. 13. The converter 1320 includes eleven switches 1322a-1322k (S1-S11), a pair of capacitors 1324a, 1324b, and a PR 1326 (here, modeled as an ideal PR), which components can be connected together as shown in FIG. 13A. In this example, soft charging of the capacitors 1324a, 1324b (1324 generally) and regulation may be achieved using a single PR 1326 and a single switch 1322k added at the output (i.e., connected to load 1352).

In some embodiments, the following eight-stage switching sequence can be used in conjunction with the hybrid SC-PR converter 1320 (i.e., the following switching sequence can be implemented within the switching controller):

1. Switches S1, S2, S3, S4, and S11 are on, connecting the PR 1326 and the switched capacitors 1324 in series between source 1350 and load 1352. The initial states of the PR's resonant inductor and capacitor are positive and negative, respectively, so positive current flows from the source 1350, through the PR 1326, through the switched capacitors 1324, and to the load 1352 during this stage. The switched capacitors 1324 increase in voltage as the current flows through them.
2. No switches are on, and the PR 1326 is open-circuited. The PR's resonant inductor still caries positive current, so it discharges the input capacitance until the input capacitance voltage equals that of the switched capacitors 1324.
3. Switches S5, S6, S7, S8, S9, and S10 are on, connecting the switched capacitors 1324 in parallel with the PR 1326. The inductor's current is still positive, so it discharges all capacitances in parallel until the switched capacitors 1324 reach their initial voltages. At this point, the PR 1326 contains all of the energy obtained from the source 1350 during the first stage.
4. No switches are on, and the PR 1326 is open-circuited. The PR's resonant inductor still caries positive current, so it discharges the input capacitance until the input capacitance voltage reaches zero.
5. Switches S2, S8, and S9 are on, shorting the terminals of the PR 1326 for the zero stage. The inductor current is still positive and the resonant capacitor voltage has reached zero. From here, the inductor current and capacitor voltage resonate through almost half of a resonant cycle, providing a critical opportunity to balance the volt-seconds applied to the inductor in other switching stage. At the end of this stage, the inductor current has reversed direction.
6. No switches are on, and the PR 1326 is open-circuited. The inductor current is negative, so the PR 1326 resonates until its input capacitance reaches the positive output voltage.
7. Switches S5, S8, and S11 are on, connecting the PR 1326 in parallel with the positive output voltage. The inductor current is still negative and delivers energy to the load.
8. No switches are on, and the PR 1326 is open-circuited. The PR 1326 resonates until its input capacitance reaches the positive input voltage. During this stage, the inductor current crosses zero to become positive again.

Figure 14A:
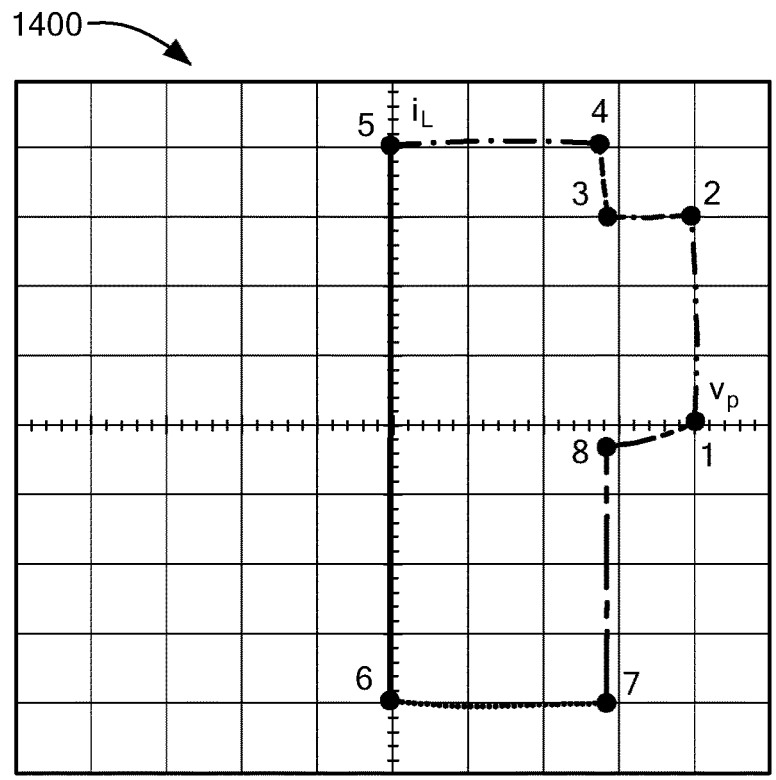
FIGS. 14A and 14B show state plane diagrams illustrating an eight-stage switching sequence implemented within a hybrid SC-PR converter.
Figure 14B:
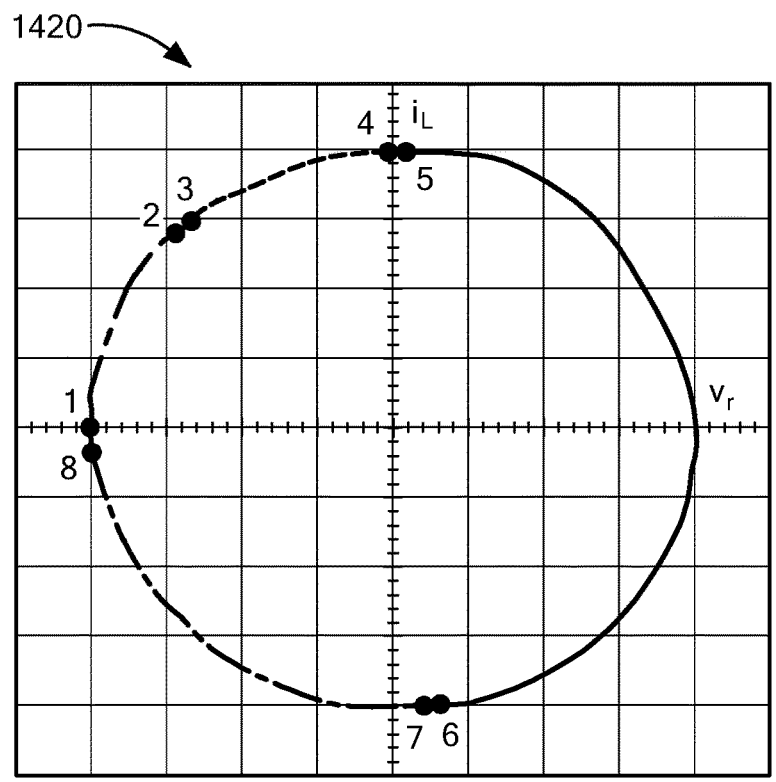

FIGS. 14A and 14B show state planes corresponding to the eight-stage switching sequence described above for hybrid SC-PR converter 1320. FIG. 14A shows an $i_L$ vs. $v_p$ plane 1400, and FIG. 14B showing an $i_L$ vs. $V_r$ plane 1420. Each stage is denoted by a different line style and with a stage number (e.g., "1," "2", "3," etc.) positioned at the starting point of the stage. Similar to the state planes of FIGS. 11A and 11B, these state planes demonstrate soft charging of the PR using open stages and all-positive instantaneous power transfer during connected stages, with a zero stage for redistributing the PR's energy.

Figure 15:
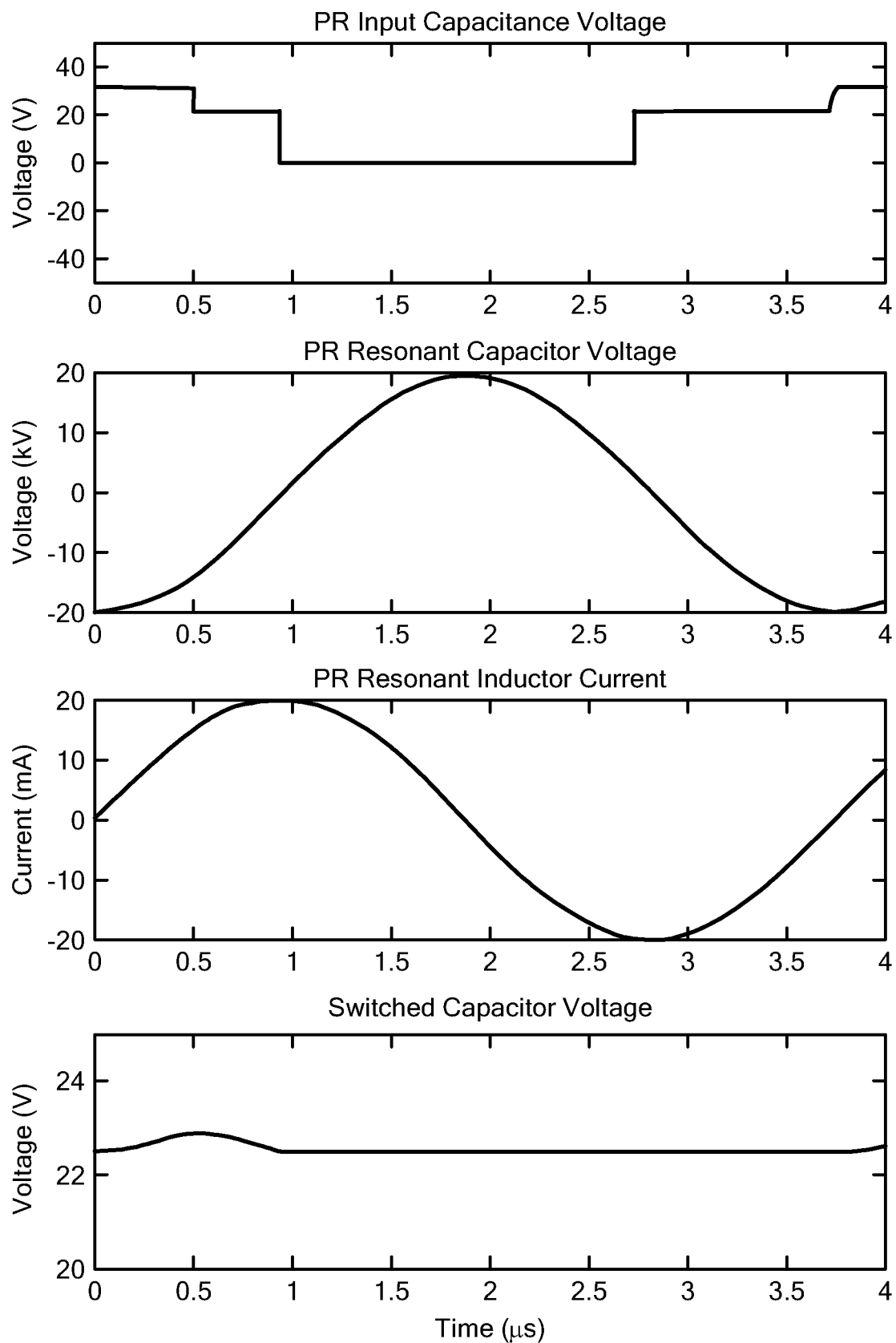
FIG. 15 shows a series of time-domain waveforms that can be generated using the hybrid SC-PR converter implementation of FIG. 13A.

FIG. 15 shows waveforms that can be generated using the hybrid SC-PR converter implementation of FIG. 13A when transferring approximately 80 mW. As can be seen by these waveforms, disclosed embodiments of a hybrid SC-PR converter can achieve soft switching of the PR on all transitions and soft charging of the switched capacitors.

Figure 16:
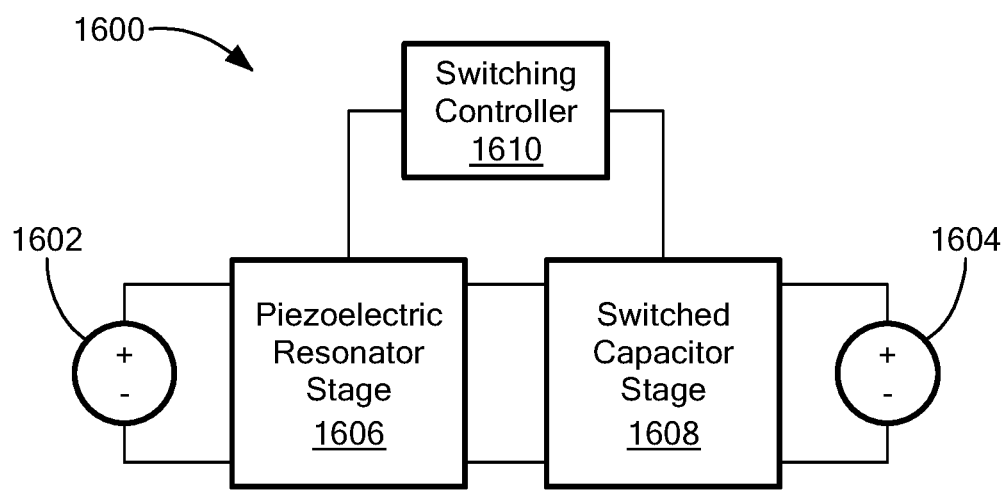
FIG. 16 is a block diagram of a two-stage converter system having a PR stage and an SC stage, according to some embodiments.

FIG. 16 shows a system 1600 having a two-stage SC-PR converter, according to some embodiments. The illustrative system 1600 includes a source 1602 and a load 1604 connected together via a PR-based converter stage 1606 and a SC converter stage 1608. The PR stage 1606 and the SC stage may be provided in a cascaded arrangement, as shown. In the embodiment shown, the PR stage 1606 is ordered before the SC stage 1608 relative to the source 1062. In other embodiments, the orders of the stages can be reversed (i.e., SC stage 1608 can be connected to the source 1602 and PR stage 1606 can be connected to the load 1604). The PR stage 1606 may include any of the previously described PR-based converter topologies (e.g., the topologies of FIGS. 5A to 5I) or implementations (e.g., the implementation of FIG. 9). The SC stage 1608 can be provided as a conventional SC converter. A switching controller 1610 may be configured to control switches within both stages 1606, 1608. In other embodiments, each stage may have its own controller.

It is recognized herein that the two-stage converter of FIG. 16 can enable a high step-down ratio (provided by the switched capacitor stage 1608) with magnetics-free voltage regulation (provided by the piezoelectric resonator stage 1606) with both stages operated in their most efficient regions. Thus, the two-stage converter of FIG. 16 may be seen as an alternative to the hybrid SC-PR converter of FIG.

13. The architecture illustrated in FIG. 16 can be applied to both step-up and step-down applications.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A dc-dc converter having an input and an output comprising:
   a plurality of switches;
   a piezoelectric resonator (PR) having a first terminal and a second terminal, wherein the plurality of switches operate in accordance with one or more switching sequences to transfer energy from the input to the output via the PR while providing low-loss resonant soft-charging of a capacitance of the PR, the switching sequences including:
      connected stages in which the first PR terminal and the second PR terminal are both connected to one of the input, the output, or the other PR terminal, and
      open stages in which at least one of the first PR terminal or the second PR terminal is not connected by a closed switch of the plurality of switches to one of the input, the output, or the other PR terminal; and
   means, coupled to the plurality of switches, for controlling the switching sequences,
   wherein at least one of the switching sequences includes at least six stages alternating between connected stages and open stages in which the connected stages each comprise a connection of the first PR terminal or the second PR terminal to one of the input or the output and a connection of the other PR terminal to a different node of the dc-dc converter.

2. The dc-dc converter of claim 1, wherein at least one of the switching sequences includes at least six stages alternating between connected stages and open stages in which one of the connected stages comprises a zero stage in which the first PR terminal and the second PR terminal are connected.

3. The dc-dc converter of claim 1, wherein at least one of the switching sequences provides zero-voltage switching (ZVS) of each of the plurality of switches.

4. The dc-dc converter of claim 3, wherein the at least one of the switching sequences that provides ZVS includes at least one open stage during which the first and second PR terminals change voltage is split into two sections.

5. The dc-dc converter of claim 1, wherein at least one of the switching sequences includes at least eight stages.

6. The dc-dc converter of claim 1, wherein the switching sequences include one or more switching sequences that has exactly one span of positive PR resonant current and exactly one span of negative PR resonant current.

7. The dc-dc converter of claim 1, wherein the PR is disposed within a switched capacitor (SC) converter comprising one or more capacitors for energy storage.

8. The dc-dc converter of claim 7, wherein the switching sequences utilize both the SC converter capacitors and the PR as energy transfer components.

9. A dc-dc converter having an input, an output, and an energy storage element consisting essentially of a piezoelectric resonator (PR), the converter comprising:
   a plurality of switching elements; and
   a piezoelectric resonator (PR) configured for power stage energy storage, the PR having first and second terminals selectively coupled to the plurality of switching elements, wherein the plurality of switching elements are arranged to operate in accordance with one or more switching sequences that provide low-loss resonant soft charging of a capacitance of the PR, wherein at least one of the switching sequences includes at least six stages alternating between connected stages and open stages in which the connected stages each comprise a connection of the first PR terminal or the second PR terminal to one of the input or the output and a connection of the other PR terminal to a different node of the PR converter.

10. The converter of claim 9, wherein at least one of the switching elements includes a unidirectional-blocking switch.

11. The converter of claim 9, wherein the plurality of switching elements includes four unidirectional-blocking switches.

12. The converter of claim 11, wherein the unidirectional-blocking switches are provided as field effect transistors.

13. The converter of claim 11, wherein the unidirectional-blocking switches are provided as metal oxide semiconductor field effect transistors (MOSFETs).

14. The converter of claim 9, wherein at least one of the switching elements includes a diode switch.

15. The dc-dc converter of claim 9 further comprising:
   a switching controller configured to operate the plurality of switching elements according to the one or more switching sequences.

16. A two-stage dc-dc converter comprising:
   a piezoelectric-resonator (PR) converter stage having an input, an output, an energy storage element consisting essentially of a PR and a plurality of switches, the PR having first and second terminals selectively coupled to the plurality of switches, the plurality of switches arranged to operate in accordance with one or more switching sequences that utilize the PR as an energy transfer component, wherein at least one of the switching sequences includes at least six stages alternating between connected stages and open stages in which the connected stages each comprise a connection of the first PR terminal or the second PR terminal to one of the input or the output and a connection of the other PR terminal to a different node of the PR converter; and a switched capacitor (SC) converter stage coupled to the PR converter stage in a cascaded arrangement.

\* \* \* \* \*